US012007705B2

(12) United States Patent
Tanimoto

(10) Patent No.: US 12,007,705 B2
(45) Date of Patent: Jun. 11, 2024

(54) PRINT HEAD AND IMAGE FORMING DEVICE

(71) Applicant: TOSHIBA TEC KABUSHIKI KAISHA, Tokyo (JP)

(72) Inventor: Koji Tanimoto, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 191 days.

(21) Appl. No.: 17/681,226

(22) Filed: Feb. 25, 2022

(65) Prior Publication Data

US 2022/0404732 A1 Dec. 22, 2022

(30) Foreign Application Priority Data

Jun. 22, 2021 (JP) ................................ 2021-103656

(51) Int. Cl.

| | |
|---|---|
| ***B41J 2/45*** | (2006.01) |
| ***G03G 15/04*** | (2006.01) |
| ***G03G 15/043*** | (2006.01) |
| ***H05B 45/46*** | (2020.01) |
| *G03G 15/00* | (2006.01) |

(52) U.S. Cl.

CPC .......... *G03G 15/04036* (2013.01); *B41J 2/45* (2013.01); *G03G 15/043* (2013.01); *H05B 45/46* (2020.01); *G03G 15/04054* (2013.01); *G03G 15/80* (2013.01); *G03G 2215/0407* (2013.01)

(58) Field of Classification Search

CPC .......... G03G 15/04036; G03G 15/043; G03G 15/04054; G03G 15/80; G03G 2215/0407; B41J 2/45; H05B 45/46

See application file for complete search history.

(56) References Cited

U.S. PATENT DOCUMENTS

| | | | | |
|---|---|---|---|---|
| 2006/0202638 A1* | 9/2006 | Kubota | H05B 45/60 315/291 |
| 2007/0242017 A1* | 10/2007 | Mitsuse | B41J 2/45 345/92 |
| 2009/0262258 A1 | 10/2009 | Taneda et al. | |

FOREIGN PATENT DOCUMENTS

| | | |
|---|---|---|
| JP | 2009220438 A | 10/2009 |
| JP | 2015136919 A | 7/2015 |

* cited by examiner

*Primary Examiner* — Yaovi M Ameh
(74) *Attorney, Agent, or Firm* — Kim & Stewart LLP

(57) ABSTRACT

The print head and light emitting elements, first and second drive circuits, and a control circuit. The light emitting elements and drive circuits are spaced from each other an arrangement pitch. The first drive circuit includes a first capacitor and sets a light emission level for the first light emitting element. The second drive circuit includes a second capacitor and sets a light emission level of the second light emitting element. The control circuit is connected to the first drive circuit by a first wiring and to the second drive circuit by a second wiring and controls voltages across the first and second capacitors individually. A difference between the length of the first wiring and the length of the second wiring is less than the arrangement pitch.

20 Claims, 16 Drawing Sheets

PRINT HEAD AND IMAGE FORMING DEVICE

CROSS-REFERENCE TO RELATED APPLICATION

This application is based upon and claims the benefit of priority from Japanese Patent Application No. 2021-103656, filed on Jun. 22, 2021, the entire contents of which are incorporated herein by reference.

FIELD

Embodiments described herein relate generally to a print head and an image forming device.

BACKGROUND

Electrophotographic printers are widely used. Such a printer includes a print head, and the print head includes a plurality of light emitting elements. Examples of the light emitting elements include a light emitting diode (LED) and an organic light emitting diode (OLED). For example, the print head is provided with the light emitting elements corresponding to 5, 120 pixels. The light emitting elements are typically arranged along a main scanning direction. A direction orthogonal to the main scanning direction is referred to as a sub-scanning direction. The printer exposes a photosensitive drum to light emitted from the plurality of light emitting elements, and then prints an image on a sheet of paper corresponding to a latent image formed on the photosensitive drum.

The density of the printed image corresponds to the amount of light emitted from each light emitting element. The amount of light emitted from each light emitting element is determined by an inter-terminal voltage of a capacitor included in a drive circuit for each light emitting element. There is a proposed print head in which the inter-terminal voltage of the capacitor included in the drive circuits for each light emitting element controlled by a voltage applying unit (such as a digital to analog (D/A) circuit) to control the amount of light emitted by each light emitting element to be uniform.

In such a print head, differences in wiring length between the drive circuit (capacitor) and the voltage applying unit cause a difference in resistance and this affects a circuit time constant when the voltage across the capacitors is being controlled (that is, when the capacitors are being charged and discharged). When there is a large difference in the wiring length (that is, wiring resistance is different), the circuit time constant will greatly differ element to element and the light amount emitted from each may be unstable or lacking in uniformity, which may lead to deterioration in printed image quality.

DETAILED DESCRIPTION

Figure 1:
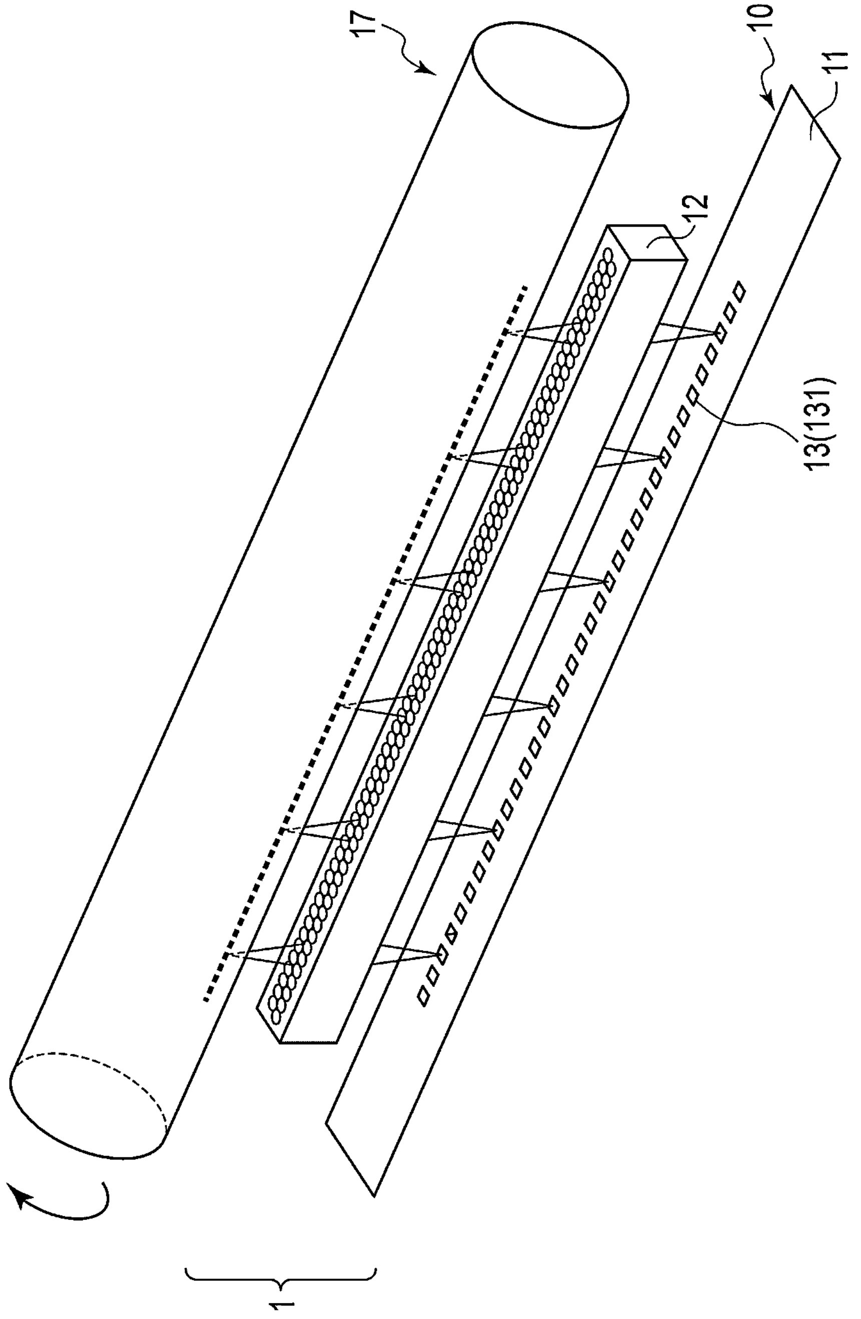
FIG. 1 illustrates an example of a positional relationship between a photosensitive drum and a print head for an image forming device.

In general, according to certain embodiments, a print head and an image forming device that incorporates a print head can prevent deterioration in image quality are provided.

According to one embodiment, print head includes a first light emitting element on a substrate and a first drive circuit connected to the first light emitting element. The first drive circuit includes a first capacitor. The first drive circuit is configured to control a light emission level of the first light emitting element by charging the first capacitor to a target level. A second light emitting element is on the substrate and separated from the first light emitting element by an element arrangement pitch value along a main scanning direction parallel to the substrate. A second drive circuit is connected to the second light emitting element and includes a second capacitor. The second drive circuit is configured to control a light emission level of the second light emitting element by charging the second capacitor to a target level. A control circuit is on the substrate and connected to the first drive circuit by a first wiring and the second drive circuit by a second wiring. The control circuit is configured to individually control voltages across the first and second capacitors at a predetermined timing. A difference between the length of the first wiring and the length of the second wiring is less than the element arrangement pitch value.

Hereinafter, certain examples of an image forming device will be described with reference to the drawings. In the drawings, the same components are denoted by the same reference numerals. The image forming device in these examples can be a printer, a copier, or a multi-function peripheral (MFP). In the present embodiment, the image forming device is a MFP.

Configuration of Print Head

An example of a configuration of a print head to be applied to an image forming device will be described with reference to FIGS. 1 to 7.

FIG. 1 illustrates an example of a positional relationship between a photosensitive drum and the print head for the image forming device.

The image forming device of the present example includes a photosensitive drum 17 and a print head 1 as illustrated in FIG. 1. The print head 1 faces the photosensitive drum 17.

The photosensitive drum 17 rotates in the direction of the arrow illustrated in FIG. 1. The rotation direction of the photosensitive drum 17 is referred to as a sub-scanning direction (alternatively as a second direction, a Y-axis direction, or a lateral direction), and a direction orthogonal to the sub-scanning direction is referred to as a main scanning direction (alternatively as a first direction, a X-axis direction, or a longitudinal direction). The photosensitive drum 17 is initially uniformly charged by an electrostatic charger and is then selectively exposed to light from the print head 1. The portions of the photosensitive drum 17 exposed to light decreases in potential (charge). That is, the image forming device controls light emission of the print head 1 to form an electrostatic latent image on the photosensitive drum 17 corresponding to image data to printed or the like. The control of the light emission of the print head 1 is the controlling of the timings of the light emission and light-off (non-light emission) of the print head 1 and to control the amount of light amount therefrom.

The print head 1 includes a light emitting unit 10 and a rod lens array 12. The light emitting unit 10 includes a transparent substrate 11 facing the rod lens array 12. For example, the transparent substrate 11 is a glass substrate that transmits light of relevant wavelength(s). A light emitting element row 13 including a plurality of light emitting elements 131 is formed on the transparent substrate 11. The print head 1 may include a plurality of light emitting element rows 13 in some examples.

The rod lens array 12 focuses light from the light emitting elements 131 on the photosensitive drum 17. Accordingly, an image line corresponding to the light emission of the light emitting elements 131 is formed on the photosensitive drum 17. The light emitting elements 131 formed on the transparent substrate 11 are controlled by current control such that the light amount at positions facing each other and sandwiching the rod lens array 12 is a predetermined value satisfying a standard or threshold value.

The light emitting elements 131 are linearly arranged in a row in the main scanning direction. Alternatively, a first light emitting element row may be formed linearly along the main scanning direction with an arrangement of the odd-numbered light emitting elements 131, and a second light emitting element row may be formed linearly along the main scanning direction with an arrangement of the even-numbered light emitting elements 131. That is, the light emitting elements 131 may be arranged in a staggered manner. In this case, the first light emitting element row and the second light emitting element row are separated from each other by a fixed distance in the sub-scanning direction. By controlling light emission timings of the first and second light emitting element rows based on a rotation speed of the photosensitive drum 17 and the fixed distance, a single linear image can be formed by the light emission from the first and second light emitting element rows.

Figure 2:
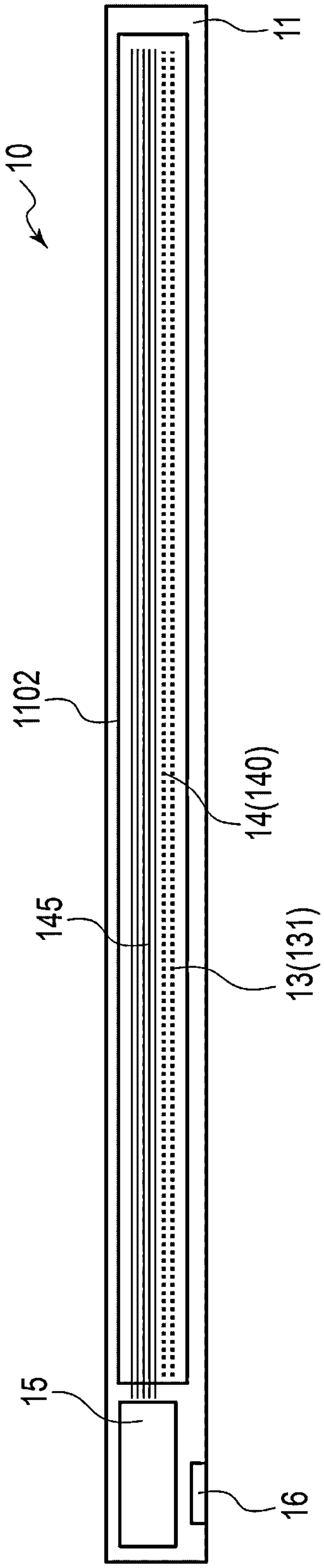
FIG. 2 illustrates an example of a transparent substrate.

FIG. 2 illustrates an example of the transparent substrate. FIG. 2 illustrates an example of the transparent substrate with a single row of light emitting elements formed thereon, but a print head may include a plurality of such rows.

As illustrated in FIG. 2, the light emitting element row 13 is formed on the transparent substrate 11 along the longitudinal direction of the transparent substrate 11. In the vicinity of the light emitting element row 13, a drive circuit row 14 and wirings 145 that supply signals to the drive circuit row 14 are arranged. The drive circuit row 14 drives each light emitting element 131 in the light emitting row 13. In this context, "drive" means to cause a light emitting element to emit light such as by the application of voltage or by supply of current. Hereinafter, "drive" may be abbreviated as "DRV".

In FIG. 2, the DRV circuit row 14 and the wirings 145 are disposed on one side of the light emitting element row 13. The DRV circuit row 14 and the wiring 145 may be separately disposed on two sides of the light emitting element row 13. The DRV circuit row 14 includes a plurality of DRV circuits 140.

An integrated circuit (IC) 15 is disposed at an end portion of the transparent substrate 11. In addition, the transparent substrate 11 includes a connector 16. The connector 16 electrically connects the print head 1 to a control system of a printer, a copier, or a multi-function peripheral. This connection enables power supply, head control, image data transfer, and the like. Another substrate that seals the light emitting element row 13, the wirings 145, the DRV circuits 140, from outside air can be attached to the transparent substrate 11. Furthermore, when the connector can not be easily mounted to the transparent substrate 11, flexible printed circuits (FPC) or the like may be connected to the transparent substrate 11 for electrically connecting to the control system and the like.

Figure 3:
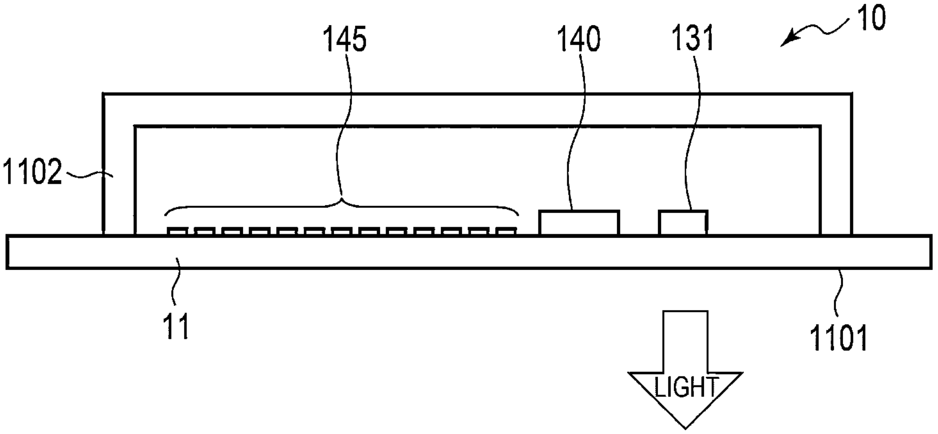
FIG. 3 illustrates an example of a cross section of the transparent substrate.

FIG. 3 illustrates an example of a cross section of the transparent substrate 11. As illustrated in FIG. 3, the light emitting unit 10 of the print head 1 includes the plurality of light emitting elements 131, the plurality of DRV circuits 140, and the wirings 145 that face a reference surface 1101 of the transparent substrate 11. The light emitting unit 10 further includes a sealing glass 1102. The plurality of light emitting elements 131, the plurality of DRV circuits 140, and the wirings 145 are arranged in a space between the transparent substrate 11 and the sealing glass 1102. The light from the light emitting elements 131 passes through the transparent substrate 11 and is emitted toward the photosensitive drum 17.

Figure 4:
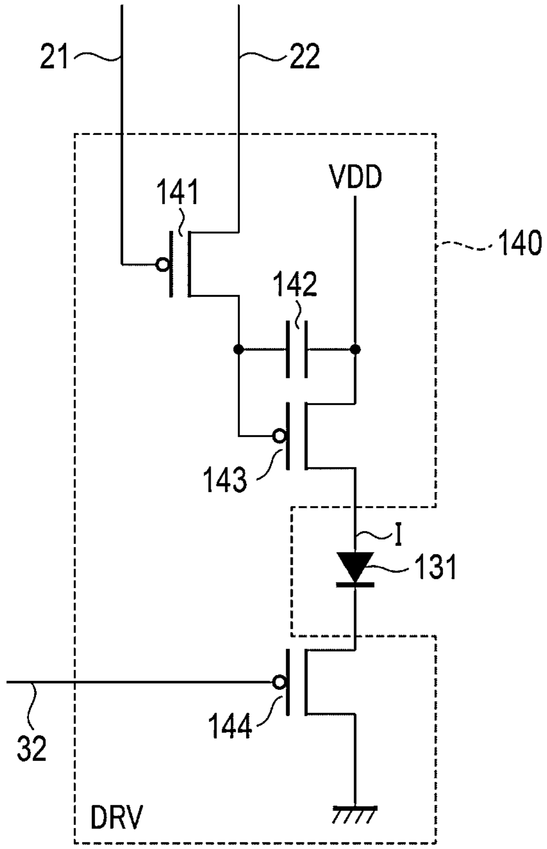
FIG. 4 shows an example of a circuit for driving a light emitting element and an example of the light emitting element that emits light when driven by the circuit.

FIG. 4 shows an example of a DRV circuit 140 that drives a light emitting element and an example of a light emitting element that emits the light when driven by the DRV circuit 140.

The DRV circuit 140 includes low-temperature polysilicon thin film transistors 141, 143, and 144 and a capacitor 142. A sample and hold (SH) signal 21 is at a low level when a light emission intensity of the light emitting element 131 connected to the DRV circuit 140 is changed. When the SH signal 21 is at the low level, the transistor 141 is in an ON state, and an inter-terminal voltage of the capacitor 142 connected to the transistor 141 and the transistor 143 changes according to a voltage of a light emission level signal 22. That is, the inter-terminal voltage of the capacitor 142 changes according to a correction value to be further described below, and a current supplied to the light emitting element 131 by the inter-terminal voltage is determined.

When the SH signal 21 is at a high level, the transistor 141 is in an OFF state, and the inter-terminal voltage of the capacitor 142 is maintained. Even when the voltage of the light emission level signal 22 changes, an inter-terminal voltage level of the capacitor 142 does not change. A current corresponding to the voltage across terminals of the capacitor 142 flows through the light emitting element 131 connected to a signal line I of the DRV circuit 140. That is, the light emitting element 131 emits light at a light amount corresponding to the inter-terminal voltage of the capacitor 142 in the DRV circuit 140. A particular DRV circuit 140 and a particular light emitting element 131 are selected from the plurality of DRV circuits 140 and the plurality of light emitting elements 131 included in the DRV circuit row 14 and the light emitting element row 13 by the SH signal 21, however, the light emission intensity is determined by the light emission level signal 22, and such light emission intensity can be maintained. The inter-terminal voltage of the capacitor may be referred to as a voltage of the capacitor or a voltage across the capacitor.

The transistor 144 in the DRV circuit 140 switches between supply and non-supply of the current (ON or OFF for the current supply) to the light emitting element 131. A pulse width modulation (PWM) signal 32 connected to the transistor 144 controls a light emission timing and a light-off timing of the light emitting element 131 (determines a light emission time per line cycle). When the transistor 144 is turned on by the PWM signal 32, the current flows through the light emitting element 131 and the light emitting element 131 emits light. When the transistor 144 is turned off by the PWM signal 32, the current does not flow through the light emitting element 131 and the light emitting element 131 is turned off.

Figure 5:
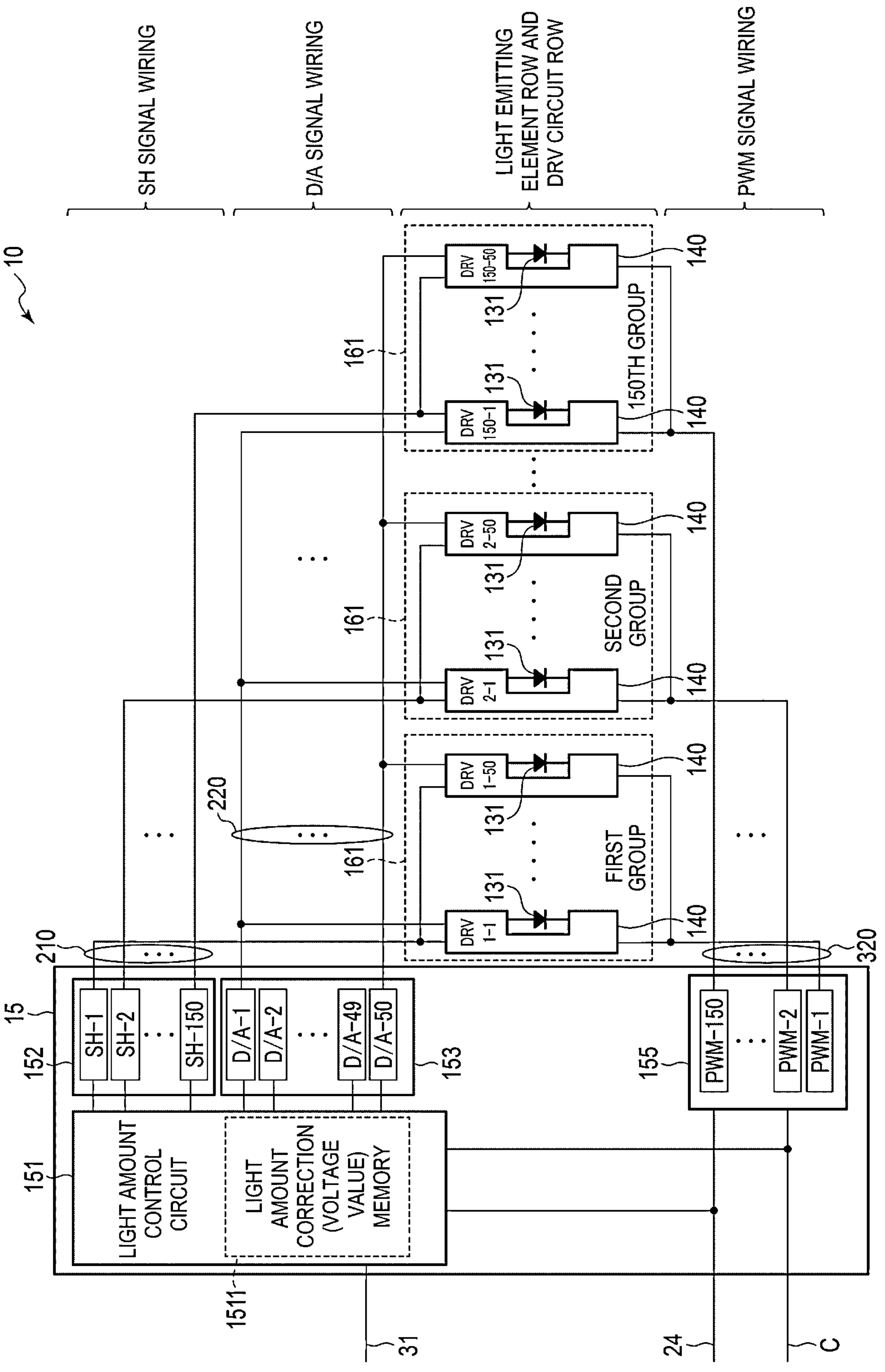
FIG. 5 shows an example of a circuit block for a print head.

FIG. 5 shows an example of a circuit block. As shown in FIG. 5, the light emitting unit 10 includes an IC 15. The IC 15 includes a light amount control circuit 151, a SH signal output circuit unit 152, a digital to analog (D/A) conversion circuit unit 153, and light emission time (PWM) control circuit unit 155. The light amount control circuit 151 includes a light amount correction (voltage value) memory 1511. The light emitting element row 13 and the DRV circuit row 14 are divided into N light emitting element groups 161 (where N is an integer of two or more, for example, N=150).

Each light emitting element group 161 includes M (where M is an integer equal to or greater than 2, for example, M=50) light emitting elements 131 from the first light emitting element 131 to the M-th light emitting element 131 and M DRV circuits 140 from the first DRV circuit to the M-th DRV circuit. As an example, in FIG. 5, the 50 DRV circuits 140 included in the first light emitting element group 161 are denoted as DRV 1-1 to DRV 1-50, and the 50 DRV circuits 140 included in the 150th light emitting element group 161 are denoted as DRV 150-1 to DRV 150-50. The same SH signal 21 and the same PWM signal 32 are supplied to the DRV circuits 140 within the same light emitting element group 161.

The SH signal output circuit unit 152 includes N SH signal output circuits from the first SH signal output circuits to the N-th SH signal output circuit corresponding to the N light emitting element groups 161 from the first light emitting element group 161 to the N-th light emitting element group 161. For example, as shown in FIG. 5, the 150 SH signal output circuits are denoted as SH-1 to SH-150.

The SH signal output circuit unit 152 is connected to each of the DRV circuits 140 of the N light emitting element groups 161 via N SH signal wirings 210. In this example, for a wiring for the first light emitting element group 161 closest to the IC 15 among the SH signal wirings 210, a part of this wiring is disposed along the main scanning direction (longitudinal direction) at a position farthest from the light emitting element row 13 and the DRV circuit row 14. The wiring for the 150th light emitting element group 161 farthest from the IC 15 among the SH signal wirings 210 in this example has a part that is disposed along the main scanning direction at a position closest to the light emitting element row 13 and the DRV circuit row 14.

The D/A conversion circuit unit 153 includes MD/A conversion circuits from the first D/A conversion circuit to the M-th D/A conversion circuit corresponding to the M DRV circuits 140 from the first DRV circuit 140 to the M-th DRV circuit 140. In FIG. 5, the 50 D/A conversion circuits are denoted as D/A-1 to D/A-50.

The D/A conversion circuit unit 153 is connected to each of the DRV circuits 140 of the N light emitting element groups 161 via D/A signal wirings 220. A D/A signal wiring 220 is a wiring for the light emission level signal 22. The D/A signal wirings 220 connecting each D/A conversion circuit included in the D/A conversion circuit unit 153 and each DRV circuit 140 is arranged such that a difference in wiring lengths will be small. For example, for the D/A signal wiring 220 for the $DRV_{x-1}$ (where x is one value between 1 to N) closest to the IC 15 in an x-th light emitting element group, a part of this wiring is disposed along the main scanning direction at a position farthest from the light emitting element row 13 and the DRV circuit row 14. Furthermore, for the D/A signal wiring 220 for the $DRV_{x-50}$ farthest from the IC 15, a part of this wiring is disposed along the main scanning direction at a position closest to the light emitting element row 13 and the DRV circuit row 14.

The PWM control circuit unit 155 includes N PWM control circuits from the first PWM control circuit to the N-th PWM control circuit corresponding to the N light emitting element groups 161 from the first light emitting element group 161 to the N-th light emitting element group 161. As shown in FIG. 5, the 150 PWM control circuits are denoted as PWM-1 to PWM-150.

The PWM control circuit unit 155 is connected to each of the DRV circuits 140 of the N light emitting element groups 161 via PWM signal wirings. Each PWM signal wiring is a wiring for the PWM signal 32, and in FIG. 5, a reference numeral 320 is given to the PWM signal wirings. For example, for a wiring for the first light emitting element group 161 closest to the IC 15, a part of this wiring is arranged along the main scanning direction at a position farthest from the light emitting element row 13 and the DRV circuit row 14. For a wiring for the 150th light emitting element group 161 farthest from the IC 15, a part of this wiring is arranged along the main scanning direction at a position closest to the light emitting element row 13 and the DRV circuit row 14.

The light amount correction memory 1511 included in the light amount control circuit 151 stores a correction value for causing each light emitting element 131 to emit light at a predetermined light amount.

The light amount control circuit 151 receives image data 31, a horizontal synchronization signal 24, and a clock C (clock signal) via the connector 16. The PWM control circuit unit 155 also receives the horizontal synchronization signal 24 and the clock C via the connector 16.

The light amount control circuit 151 outputs the correction value to the D/A conversion circuit unit 153 in synchronization with the horizontal synchronization signal 24 and the clock C. The light emission and the non-light emission (ON and OFF) of the light emitting elements 131 are determined based on image data. When a light emitting element 131 emits light based on the image data, the light amount control circuit 151 outputs the correction value stored in the light amount correction memory 1511 for the light emitting element 131. When, based on the image data, the light emitting element 131 does not emit light, the light amount control circuit 151 outputs a predetermined correction value for not causing the light emitting element 131 to emit any light. The D/A conversion circuit unit 153 to which the correction value is input outputs the light emission level signal 22 (corresponding to the input correction value) to the DRV circuits 140 in a subsequent stage through the D/A signal wirings 220.

The SH signal output circuit unit 152 supplies the SH signal 21 to the DRV circuits 140. By the SH signal 21 from the SH signal output circuit unit 152 and the light emission level signal 22 from the D/A conversion circuit unit 153, the inter-terminal voltage of the capacitors is set for each light emitting element group in turn. That is, the SH signal output circuit unit 152 and the D/A conversion circuit unit 153 function as a voltage setting unit. Further, the PWM control circuit unit 155 supplies the PWM signal 32 for controlling the ON/OFF timings of the light emitting elements 131 to the DRV circuits 140.

The DRV circuit 140 generates a drive signal causing a light emitting element 131 to emit light based on the SH signal 21, the light emission level signal 22, and the PWM signal 32 output from the IC 15. That is, the DRV circuit 140 supplies a drive current determined by the light emission level signal 22 to a light emitting element 131 at the timing determined by the PWM signal 32.

Figure 6:
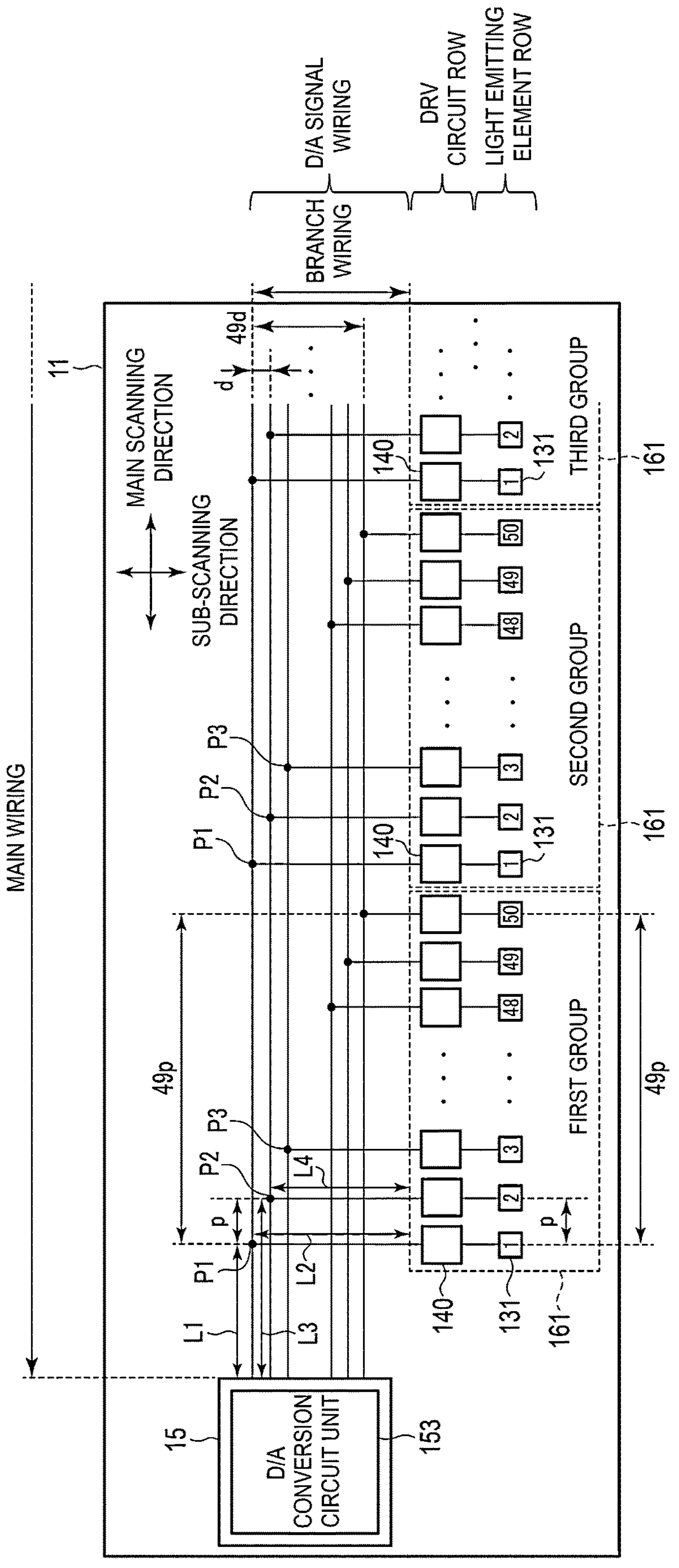
FIG. 6 shows an example of a first wiring pattern of a D/A signal wiring.

FIG. 6 shows an example of a first wiring pattern of the D/A signal wiring.

In the print head 1, the wiring between the DRV circuit (capacitor) 140 and the D/A conversion circuit unit 153 causes as an electrical resistance (corresponding to the length of the wiring) and this affects a circuit time constant value when the voltage of the capacitor is being controlled (the capacitor is being charged or discharged). When there is a large difference in the wiring length (resistance) for different DRV circuits 140, the circuit time constant will significantly differ and the light amount from different light emitting elements 131 can be unstable or non-uniform, which may lead to deterioration in image quality.

Therefore, the print head 1 of the present embodiment incorporates the first wiring pattern shown in FIG. 6. The print head 1 includes the transparent substrate 11, and the transparent substrate 11 has a planar surface (or a virtual plane) parallel to the main scanning direction and the sub-scanning direction. The plurality of light emitting elements 131 including first and second light emitting elements are disposed on the transparent substrate 11. The light emitting elements 131 are arranged along the main scanning direction at intervals of an element arrangement pitch p. That is, the first light emitting element and the second light emitting element are spaced from each other in the main scanning direction at the element arrangement pitch p.

The plurality of DRV circuits 140 including first and second DRV circuits are arranged on the transparent substrate 11. The first DRV circuit is connected to the first light emitting element, includes a first capacitor, and controls a light emission amount of the first light emitting element by the inter-terminal voltage of the first capacitor. The second DRV circuit is connected to the second light emitting element, includes a second capacitor, and controls a light emission amount of the second light emitting element by the inter-terminal voltage of the second capacitor.

The IC 15 (incorporating each D/A conversion circuit of the D/A conversion circuit unit 153) is connected to each DRV circuit by a corresponding wiring, and controls the light emission of the M light emitting element groups 161 in of group units. For example, the IC 15 is connected to the first DRV circuit by a first wiring and is connected to the second DRV circuit by a second wiring, and individually controls the inter-terminal voltages of the first and second capacitors at a predetermined timing. In the first wiring pattern, the difference between the length of the first wiring and the length of the second wiring is less than the element arrangement pitch p.

Here, certain details of the first and second wirings will be described. In the first wiring pattern, the IC 15 and each DRV circuit 140 are connected by a combination of a linear main wiring along the main scanning direction and a linear branch wiring along the sub-scanning direction.

The first wiring includes a first main wiring connected to the IC 15 and extending in the main scanning direction, and a first branch wiring branched from a first branch position P1 of the first main wiring, connected to the first DRV circuit, and extending in the sub-scanning direction. The first main wiring has a length L1 from the IC 15 to the first branch position P1, and the first branch wiring has a length L2 from the first branch position P1 to the first DRV circuit.

The second wiring includes a second main wiring connected to the IC 15 and extending in the main scanning direction, and a second branch wiring branched from a second branch position P2 of the second main wiring, connected to the second DRV circuit, and extending in the sub-scanning direction. The second main wiring has a length L3 from the IC 15 to the second branch position P2, and the second branch wiring has a length L4 from the second branch position P2 to the second DRV circuit. The length L1 is smaller than the length L3, and the length L2 is larger than the length L4.

The difference between the lengths of the first and second wirings for two light emitting elements (for example, the first light emitting element (1) and the 50-th light emitting element (50)) located at opposite ends of the light emitting element group 161 is the maximum difference, and the difference between these wiring lengths is less than (M−1) times the element arrangement pitch p.

As shown in FIG. 6, in the first wiring pattern, the difference between the wiring lengths from the IC 15 to the DRV circuits 140 can be reduced. When the element arrangement pitch (p) and a D/A signal wiring distance (d) are defined, the greatest difference in wiring distance in a light emitting element group 161 will be the difference in wiring distance between the first light emitting element (1) and the 50-th light emitting element (50). The difference is as follows:

$$49p-49d=(p-d)\times 49$$

When p=42 μm and d=5 μm, the difference is 1,813 μm. This difference is less than 2,058 μm (49p) by the arrangement pitch of the light emitting elements 131. The print head 1 thus has only relatively small differences in wiring lengths, which reduces a variation in the light amount within the light emitting element group 161. As a result, the print head 1 can reduce deterioration in image quality otherwise due to differences in the wiring length.

Figure 7:
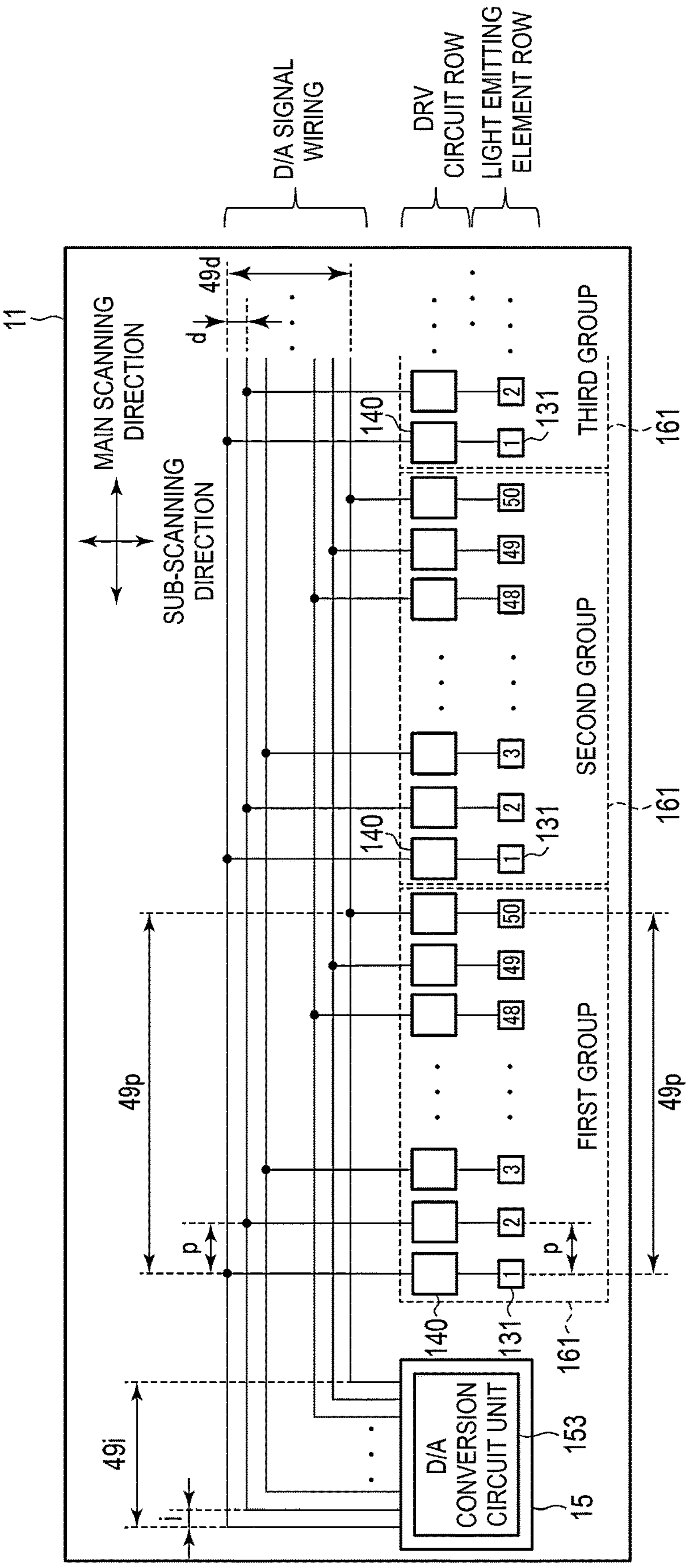
FIG. 7 shows an example of a second wiring pattern.

FIG. 7 shows an example of a second wiring pattern.

The print head 1 can have the second wiring pattern shown in FIG. 7. The IC 15 is connected to the first DRV circuit by the first wiring and is connected to the second DRV circuit by the second wiring, and individually controls the inter-terminal voltages of the first and second capacitors at predetermined timings. In the second wiring pattern, the length of the first wiring is the same as the length of the second wiring. The term "same" in this context does not necessarily mean "exactly same", but includes minor differences due to variations in design and manufacturing tolerances such that lengths are substantially the same in view of such possible variations.

In the first wiring pattern, the difference occurs in the length of the wiring within one light emitting element group 161. In the second wiring pattern, the difference is eliminated by adding wiring length according to the difference. In the first wiring pattern, the IC 15 and each DRV circuit 140 are connected by a combination of the linear main wiring along the main scanning direction and the linear branch wiring along the sub-scanning direction. In contrast, in the second wiring pattern, the main wiring can be extended to eliminate or compensate for the wiring length differences present in the first wiring pattern or the like.

The wirings to the DRV circuits 140 of the first light emitting element (1) and the 50-th light emitting element (50) located at two opposite ends of the light emitting element group 161 will be described as an example.

In FIG. 7, wiring terminals of the IC 15 (D/A conversion circuit unit 153) for the DRV circuits 140 are arranged in the main scanning direction, and a pitch thereof is the value i. As shown in FIG. 7, the wirings to the DRVs 140 are drawn out (led out) from respective terminals in the sub-scanning direction (upward) and bent in the main scanning direction (rightward) to form the main wirings. A wiring drawn-out position of the first light emitting element (1) closest to the IC 15 with respect to the DRV circuit 140 is a position farthest from the DRV circuit 140 (left side in the main scanning direction). In contrast, a wiring drawn-out position of the 50-th light emitting element (50) farthest from the IC 15 with respect to the DRV circuit 140 is a position closest to the DRV circuit 140 (right in the main scanning direction). With such a wiring pattern, the difference can be reduced by a distance "49i" in main wirings (wiring portions in the main scanning direction). The difference can also be reduced by "49d" in branch wirings (wiring portions in the sub-scanning direction) for the IC 15.

The difference in distance between the two light emitting elements (for example, the first light emitting element (1) and the 50-th light emitting element (50)) located at two opposite ends of the light emitting element group 161 in the second wiring pattern is as follows:

$$49p-(49d\times 2+49i)=(p-2d-i)\times 49$$

When p=42 μm, d=5 μm, and i=32 μm, the difference in distance is 0 (that is, the difference can be eliminated). In the print head 1, there is no difference in the wiring length, and thus variation in the light amount in the light emitting element group 161 is substantially eliminated. As a result, the print head 1 can sufficiently reduce the deterioration in image quality due to the difference in wiring length.

Configuration of Image Forming Device

Figure 8:
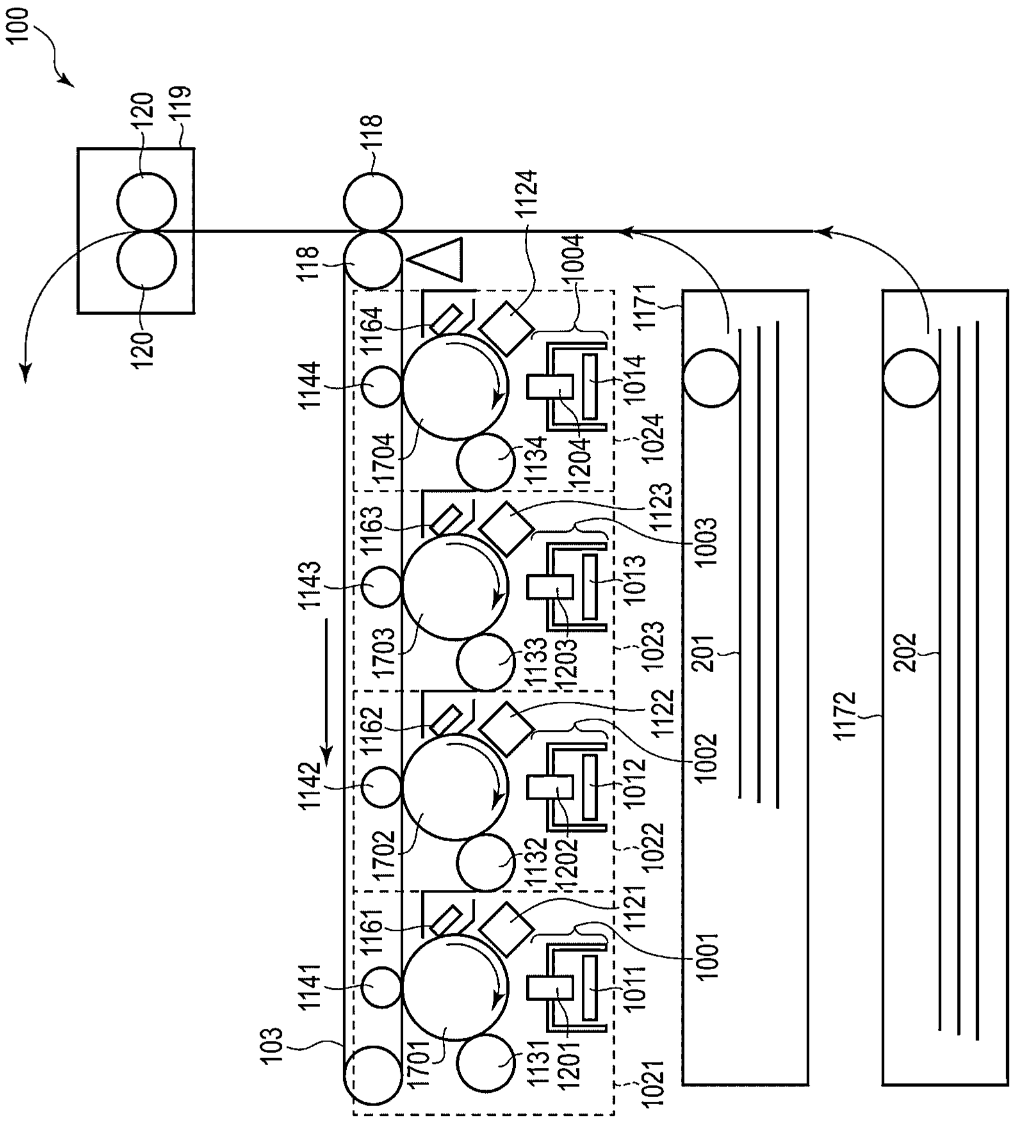
FIG. 8 shows an example of an image forming device.

FIG. 8 shows an example of the image forming device to which a print head 1 or the like can be applied. FIG. 8 shows an example of a four-drum tandem color image forming device, but the print head 1 can also be applied to a monochrome image forming device.

As shown in FIG. 8, an image forming device 100 includes an image forming unit 1021 that forms a yellow (Y) image, an image forming unit 1022 that forms a magenta (M) image, an image forming unit 1023 that forms a cyan (C) image, and an image forming unit 1024 that forms a black (K) image. The image forming units 1021, 1022, 1023, and 1024 form the yellow, cyan, magenta, and black images, respectively, and transfer these images onto a transfer belt 103. Accordingly, a full-color image is formed on the transfer belt 103.

The image forming unit 1021 that forms the yellow (Y) image includes a print head 1001, and the print head 1001 includes a light emitting unit 1011 and a rod lens array 1201. The image forming unit 1021 has a charger 1121, the print head 1001, a developing device 1131, a transfer roller 1141, and a cleaner 1161 disposed around a photosensitive drum 1701. The print head 1001 of this example corresponds in structure to the print head 1. Similarly, the light emitting unit 1011 corresponds to the light emitting unit 10, the rod lens array 1201 corresponds to the rod lens array 12, the photosensitive drum 1701 corresponds to the photosensitive drum 17, and additional descriptions thereof are thus omitted.

The image forming unit 1022 that forms the magenta (M) image includes a print head 1002, and the print head 1002 includes a light emitting unit 1012 and a rod lens array 1202. The image forming unit 1022 has a charger 1122, the print head 1002, a developing device 1132, a transfer roller 1142, and a cleaner 1162 disposed around a photosensitive drum 1702. The print head 1002 corresponds in structure to the print head 1. Similarly, the light emitting unit 1012 corresponds to the light emitting unit 10, the rod lens array 1202 corresponds to the rod lens array 12, the photosensitive drum 1702 corresponds to the photosensitive drum 17, and additional descriptions thereof are thus omitted.

The image forming unit 1023 that forms the cyan (C) image includes a print head 1003, and the print head 1003 includes a light emitting unit 1013 and a rod lens array 1203. The image forming unit 1023 has a charger 1123, the print head 1003, a developing device 1133, a transfer roller 1143, and a cleaner 1163 disposed around a photosensitive drum 1703. The print head 1003 corresponds in structure to the print head 1. Similarly, the light emitting unit 1013 corresponds to the light emitting unit 10, the rod lens array 1203 corresponds to the rod lens array 12, the photosensitive drum 1703 corresponds to the photosensitive drum 17, and additional description thereof are thus omitted.

The image forming unit 1024 that forms the black (K) image includes a print head 1004, and the print head 1004 includes a light emitting unit 1014 and a rod lens array 1204. The image forming unit 1024 has a charger 1124, the print head 1004, a developing device 1134, a transfer roller 1144, and a cleaner 1164 disposed around a photosensitive drum 1704. The print head 1004 corresponds in structure to the print head 1. Similarly, the light emitting unit 1014 corresponds to the light emitting unit 10, the rod lens array 1204 corresponds to the rod lens array 12, the photosensitive drum 1704 corresponds to the photosensitive drum 17, and additional descriptions thereof are thus omitted.

The chargers 1121, 1122, 1123, and 1124 uniformly charge the photosensitive drums 1701, 1702, 1703, and 1704, respectively. The print heads 1001, 1002, 1003, and 1004 form electrostatic latent images on the photosensitive drums 1701, 1702, 1703, and 1704, respectively, by exposing the photosensitive drums 1701, 1702, 1703, and 1704 to the light emitted from the light emitting elements 131. The developing device 1131 adheres a yellow toner to the respective drum, the developing device 1132 adheres a magenta toner to the respective drum, the developing device 1133 adheres a cyan toner to the respective drum, and the developing device 1134 adheres a black toner to the respective drum. That is, the respective developing devices 1131, 1132, 1133, and 1134 supply toner to develop the electrostatic latent image portions on the respective photosensitive drums 1701, 1702, 1703, and 1704.

The transfer rollers 1141, 1142, 1143, and 1144 respectively transfer toner images from the photosensitive drums 1701, 1702, 1703, and 1704 onto the transfer belt 103. The cleaners 1161, 1162, 1163, and 1164 respectively clean the toner remaining on the photosensitive drums 1701, 1702, 1703, and 1704 after transfer of the toner image to the transfer belt 103, and thus prepare the drums 1701, 1702, 1703, and 1704 for the next image formation process.

A sheet 201 of a first size (e.g., small size) is stored in a sheet cassette 1171. A sheet 202 of a second size (e.g., a large size) is stored in a sheet cassette 1172.

The toner image is transferred from the transfer belt 103 to a sheet 201 or 202 that has been taken out from the sheet cassette 1171 or 1172 by a pair of transfer rollers 118. The sheet 201 or sheet 202 to which the toner image is transferred is then heated and pressed by a fixing roller 120 of a fixing unit 119. The toner image is firmly fixed to the sheet 201 or 202 by being heated and pressed by the fixing roller 120. By repeating the above process operations, an image forming operation can be repeatedly performed.

Figure 9:
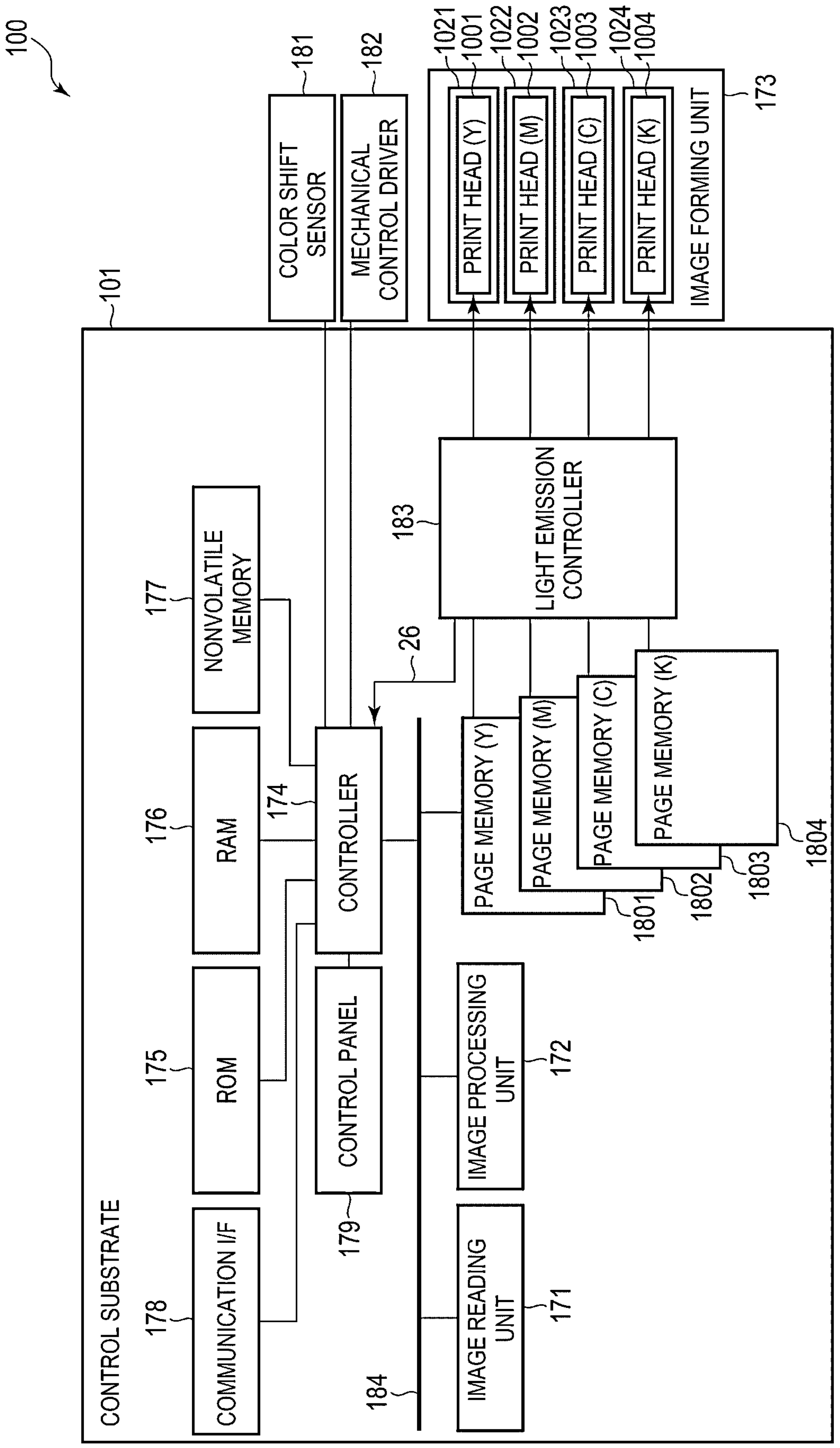
FIG. 9 is a block diagram showing an example of a control system.

FIG. 9 is a block diagram showing an example of a control system of the image forming device 100.

As shown in FIG. 9, the image forming device 100 includes a control substrate 101, which may also be referred to as a control board, a controller board, a printed circuit board, or the like. The control substrate 101 includes an image reading unit 171, an image processing unit 172, an image forming unit 173, a controller 174, a read only memory (ROM) 175, a random access memory (RAM) 176, a nonvolatile memory 177, a communication I/F 178, a control panel 179, page memories 1801, 1802, 1803, and 1804, a light emission controller 183, and an image data bus 184. The image forming device 100 further includes a color shift sensor 181 and a mechanical control driver 182. The image forming unit 173 includes the image forming units 1021, 1022, 1023, and 1024.

The ROM 175, the RAM 176, the nonvolatile memory 177, the communication I/F 178, the control panel 179, the color shift sensor 181, the mechanical control driver 182, and the light emission controller 183 are connected to the controller 174.

The image reading unit 171, the image processing unit 172, the controller 174, and the page memories 1801, 1802, 1803, and 1804 are connected to the image data bus 184. Each of the page memories 1801, 1802, 1803, and 1804 outputs the image data 31 for Y, M, C, or K image channels. The light emission controller 183 is connected to the page memories 1801, 1802, 1803, and 1804, and receives the image data 31 of the Y-channel from the page memory 1801, the image data 31 of the M-channel from the page memory 1802, the image data 31 of the C-channel from the page memory 1803, and the image data 31 of the K-channel from the page memory 1804. The print heads 1001, 1002, 1003, and 1004 are connected to the light emission controller 183. The light emission controller 183 sends the image data 31 of Y-, M-, C-, and K-channels to the print heads 1001, 1002, 1003, or 1004 as appropriate.

The controller 174 includes one or more processors, and controls operations such as image reading, image processing, and image formation according to various programs stored in the ROM 175 and/or the nonvolatile memory 177.

The controller 174 sends image data for a test pattern to the page memories 1801, 1802, 1803, and 1804, and then causes the test pattern to be formed/printed. The color shift sensor 181 detects the test pattern as formed on the transfer belt 103 and outputs a detection signal to the controller 174. The controller 174 can recognize a positional relationship of test patterns of respective colors from an input from the color shift sensor 181. The controller 174 selects the sheet cassette 1171 or 1172 to supply a sheet to be printed by controlling the mechanical control driver 182.

The ROM 175 stores various programs and the like required for the operations of the controller 174. The various programs include a light emission control program for the print head(s). The light emission control program is for controlling timings of the light emission from the print head based on the image data being printed.

The RAM 176 temporarily stores data required by the controller 174 for control operations. The nonvolatile memory 177 may store a part or all of the various programs, parameters, and the like.

The mechanical control driver 182 controls an operation of a motor and the like required for printing in accordance with an instruction from the controller 174. The communication I/F 178 outputs various kinds of information to an outside and receives various kinds of information from the outside. For example, the communication I/F 178 acquires image data including a plurality of image lines. The image forming device 100 prints the image data acquired via the communication I/F 178 by a print function. The control panel 179 receives operations input by a user or a serviceman.

The image reading unit 171 optically reads an image of a document placed on a document table, acquires image data comprising a plurality of image lines (scanned image lines), and outputs the image data to the image processing unit 172. The image processing unit 172 performs various types of image processing such as corrections on the image data received via the communication I/F 178 or from the image reading unit 171. The page memories 1801, 1802, 1803, and 1804 store the image data after it has been processed by the image processing unit 172. The controller 174 edits or adjusts the image data stored in the page memories 1801, 1802, 1803, and 1804 to match an expected printing position of the print head. The image forming unit 173 then forms an image based on the image data stored in the page memories 1801, 1802, 1803, and 1804. That is, the image forming unit 173 forms the image based on the output from the light emitting elements 131 which is set according to the image data.

The light emission controller 183 includes one or more processors, and controls the light emission of the light emitting elements 131 based on image data according to the various programs stored in at least one of the ROM 175 and the nonvolatile memory 177. That is, the light emission controller 183 outputs a drive signal causing the light emitting elements 131 to emit light at predetermined times.

Light Emission Control

Figure 10:
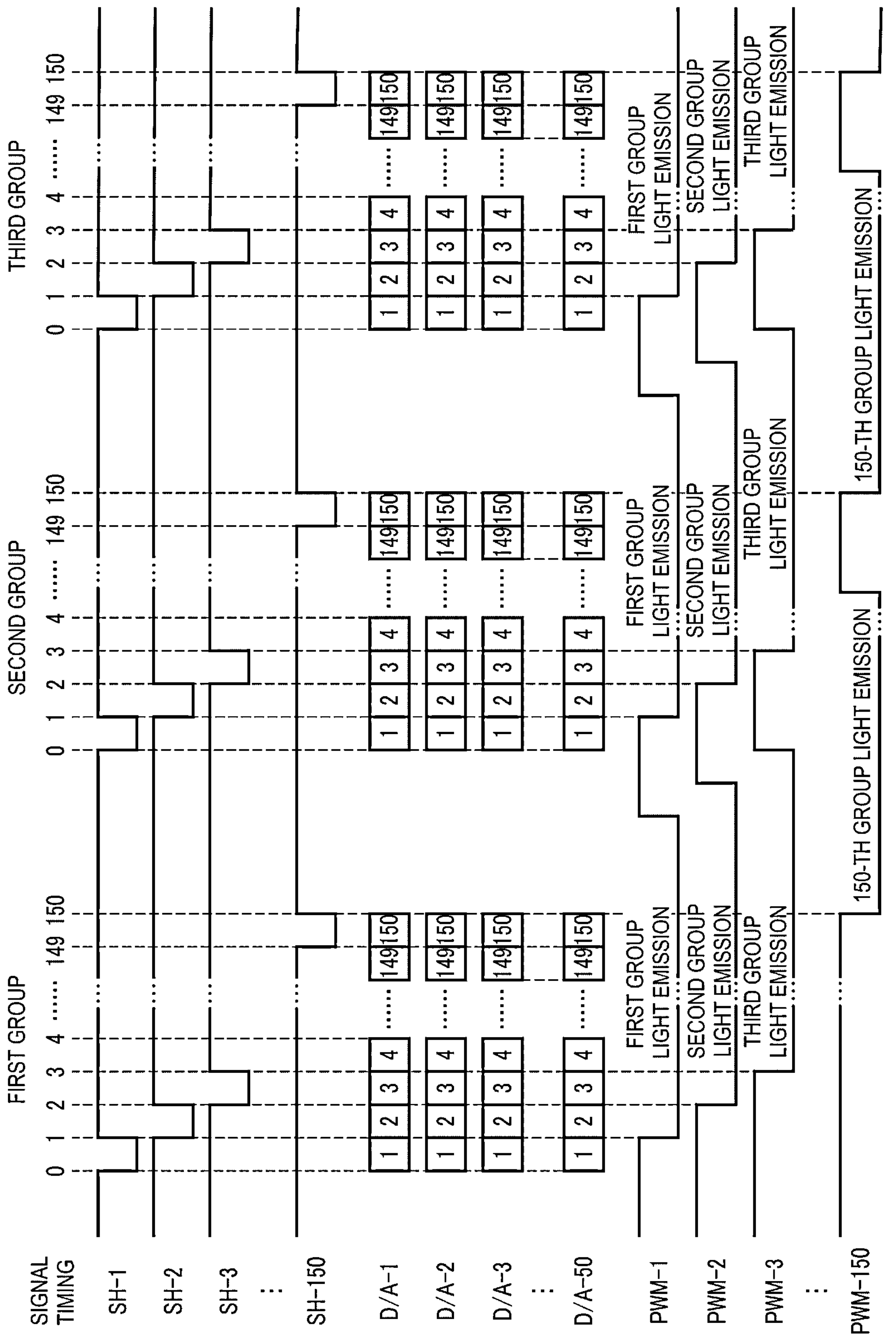
FIG. 10 is a timing chart of circuit block operations and shows signal setting timings for first to third groups.

FIG. 10 is a timing chart of circuit block operations corresponding to FIG. 5, and shows signal setting timings for the first to third groups.

Between signal timings 0 and 1, the signal SH-1 of the SH signal output circuit unit 152 is L (logic low/OFF). The signal SH-1 is a sample signal for setting a voltage of the DRV circuits 140 of the first group. While the signal SH-1 is L, the D/A conversion circuit unit 153 (D/A-1 to D/A-50) outputs the voltage to be set in the DRV circuits 140 (DRV1-1 to DRV1-50) of the first group. That is, as seen in FIG. 10, each of D/A-1 to D/A-50 outputs a voltage value (1) to the respective DRV1-1) to the DRV1-50. At a rising edge of the signal SH-1 at the signal timing 1, the voltage value (1) output from the D/A-1 to the D/A-50 will be held by capacitors in the DRV1-1 to the DRV1-50. At the same signal timing 1, the PWM-1 signal is L. When the PWM-1 signal is L, a current corresponding to the voltage value (1) held in the capacitors 142 of the DRV circuits 140 starts to flow through the light emitting elements 131 connected to DRV1-1 to DRV1-50. The current flows while the PWM-1 signal is L. Here, the voltage expressed as the voltage value (1) is a voltage value for each of the light emitting elements 131 of the first group to emit light at a predetermined light intensity, and this value can be different for each light emitting element 131.

Between signal timings 1 and 2, a signal SH-2 is L. The signal SH-2 is a sample signal for setting a voltage of the DRV circuits 140 of the second group. While the signal SH-2 is L, the D/A conversion circuit unit 153 (D/A-1 to D/A-50) outputs the voltage to be set to the DRV circuits 140 (DRV2-1 to DRV2-50) of the second group. That is, the D/A-1 outputs a voltage value (2) to the DRV2-1, the D/A-2 outputs the voltage value (2) to the DRV2-2, and so forth to the D/A-50, which outputs the voltage value (2) to the DRV2-50. At a rising edge of the signal SH-2 at the signal timing 2, the voltage value (2) output from the D/A-1 to the D/A-50 is held by capacitors of the DRV2-1 to the DRV2-50. At the same signal timing 2, the PWM-2 signal is L. When the PWM-2 signal is L, a current corresponding to the voltage value (2) held in the capacitors 142 of the DRV circuits 140 starts to flow through the respective light emitting elements 131 connected to DRV2-1 to DRV2-50. The current flows while the PWM-2 signal is L. Here, the voltage expressed as the voltage value (2) is a voltage value that may be different for each of the light emitting elements 131 of the second group. The voltage value (2) for any specific light emitting element 2 is the value for causing the light emitting element to emit light at a predetermined light intensity, and the voltage may be different for each light emitting element 131.

The light intensity setting and the light emission control for the first group and the second group are described above. In the third and subsequent groups, the light intensity setting and the light emission control of each light emitting element 131 may be performed on a group basis. The light intensity setting and the light emission control of all the light emitting elements 131 (up to the 150th group) can be performed.

Figure 11:
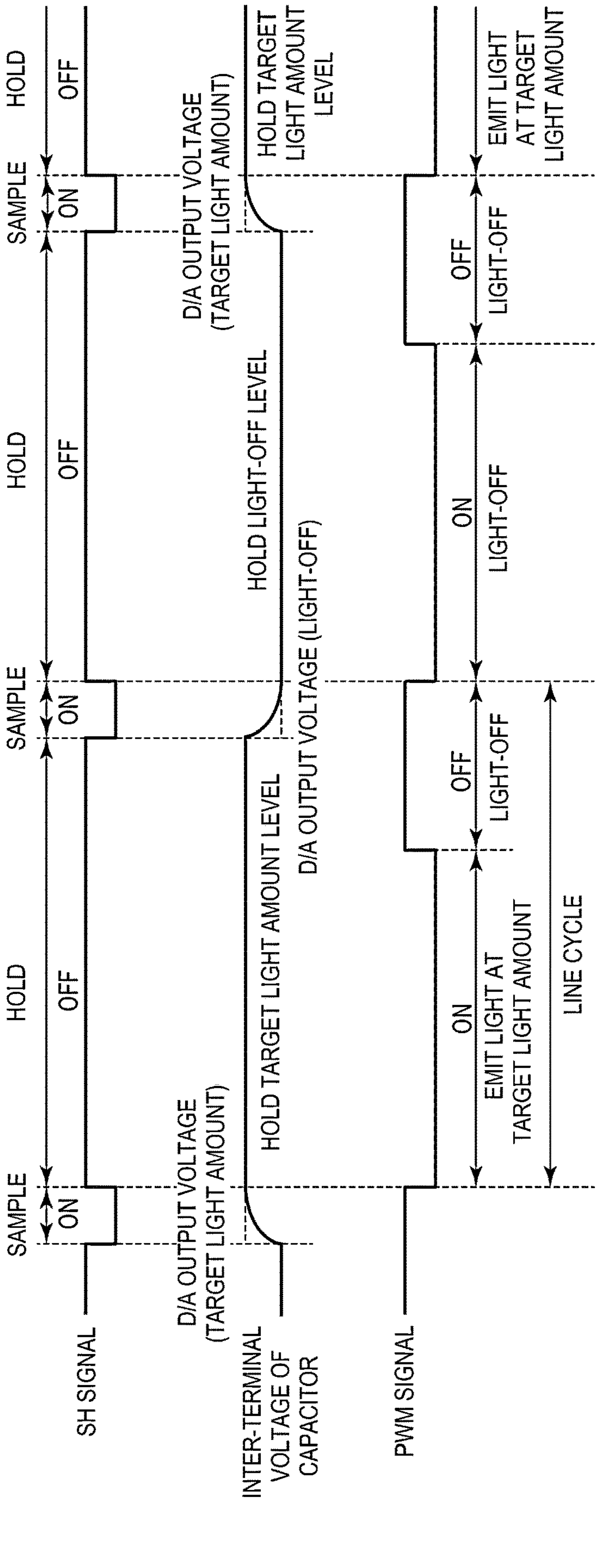
FIG. 11 is a timing chart of an example of drive circuit operations.

FIG. 11 is a timing chart of an example of DRV circuit operations of the print head. Since all the DRV circuits 140 perform the same operations, the SH signal 21 and the PWM signal 32 are not specified, and the operations will be described by focusing on the inter-terminal voltage of the capacitor 142 of a DRV circuit 140.

At a first sample time (SH signal=L), the D/A conversion circuit outputs a voltage for a target light emission (level (intended light intensity or light output amount). The inter-terminal voltage of the capacitor follows (samples) the voltage of the target light emission level. When the SH signal is H, the voltage of the target light emission level is held between terminals of the capacitor. While the PWM signal is L, the current corresponding to the voltage held in the capacitor flows through the light emitting element 131. During this time, the light emitting element 131 emits light at the target light level.

At a next sample time (SH signal=L), the D/A conversion circuit outputs a voltage of a light-off level. The inter-terminal voltage of the capacitor follows (samples) the light-off level voltage. When the SH signal is H, the light-off level voltage is held between the terminals of the capacitor. While the PWM signal is L, a current corresponding to the voltage held in the capacitor flows through the light emitting element 131. In this case, the voltage held in the capacitor is at the light-off level, so no current flows through the light emitting element 131, and the light emitting element 131 does not emit light.

Influence of Differences in Wiring Length of D/A Signal Wiring

Figure 12:
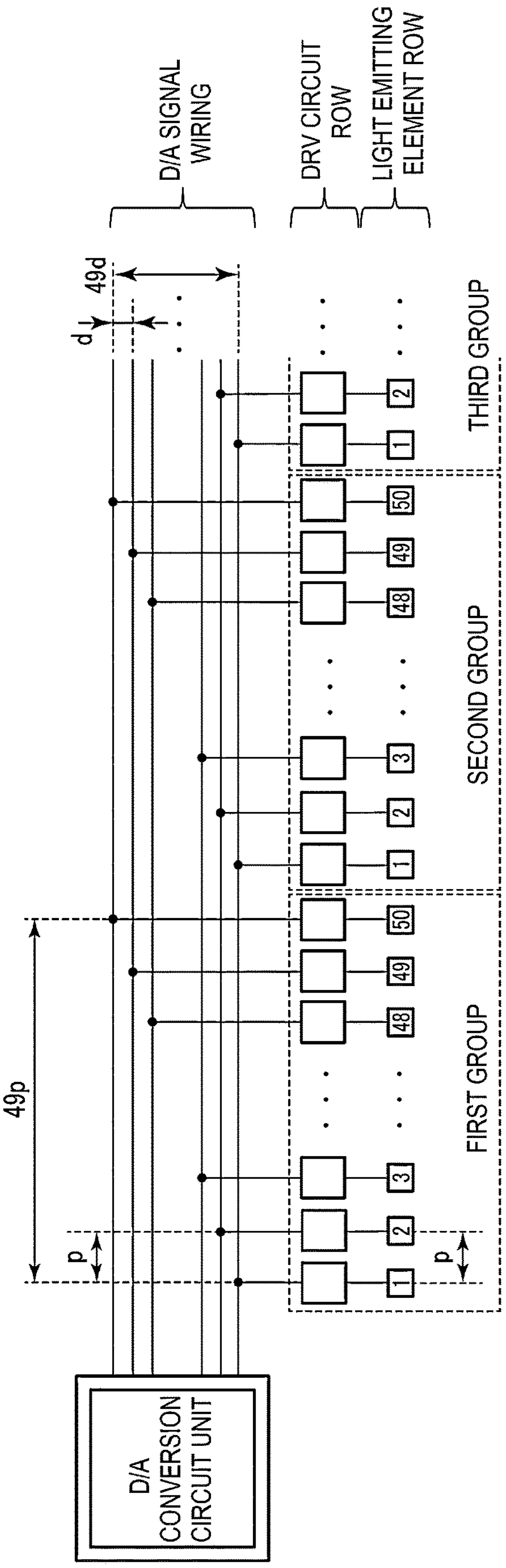
FIG. 12 shows an example of a third wiring pattern.

FIG. 12 shows an example of a third wiring pattern.

The first wiring pattern shown in FIG. 6 is a pattern in which the difference in the wiring length is reduced, and the second wiring pattern shown in FIG. 7 is a pattern in which the difference in the wiring length is eliminated. In contrast, the third wiring pattern shown in FIG. 12 is a pattern in which the difference in the wiring length is large.

In the third wiring pattern, the largest difference in the wiring distance within a light emitting element group is a difference in the wiring distance between the first light emitting element (1) and the 50-th light emitting element (50). The difference is as follows:

$$49p+49d=(p+d)\times 49$$

When p=42 μm and d=5 μm, the difference is 2,303 μm. This difference is larger than the difference of 2,058 μm (49p) caused by the light emitting element arrangement pitch.

Figure 13:
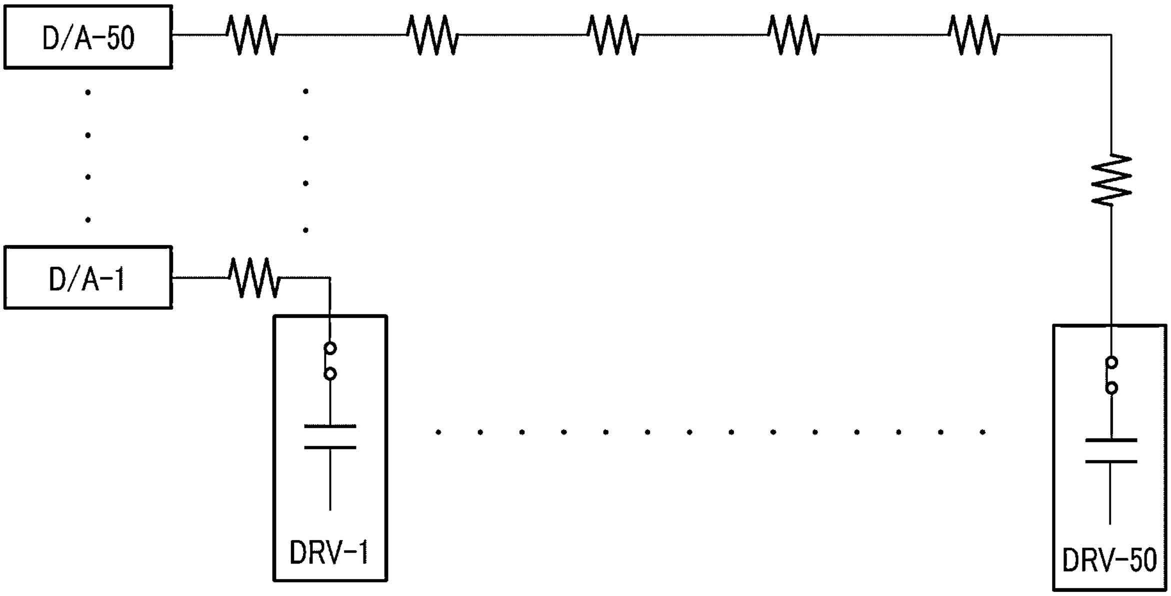
FIG. 13 schematically depicts a relationship between differences in wiring lengths and resistance components.
Figure 14:
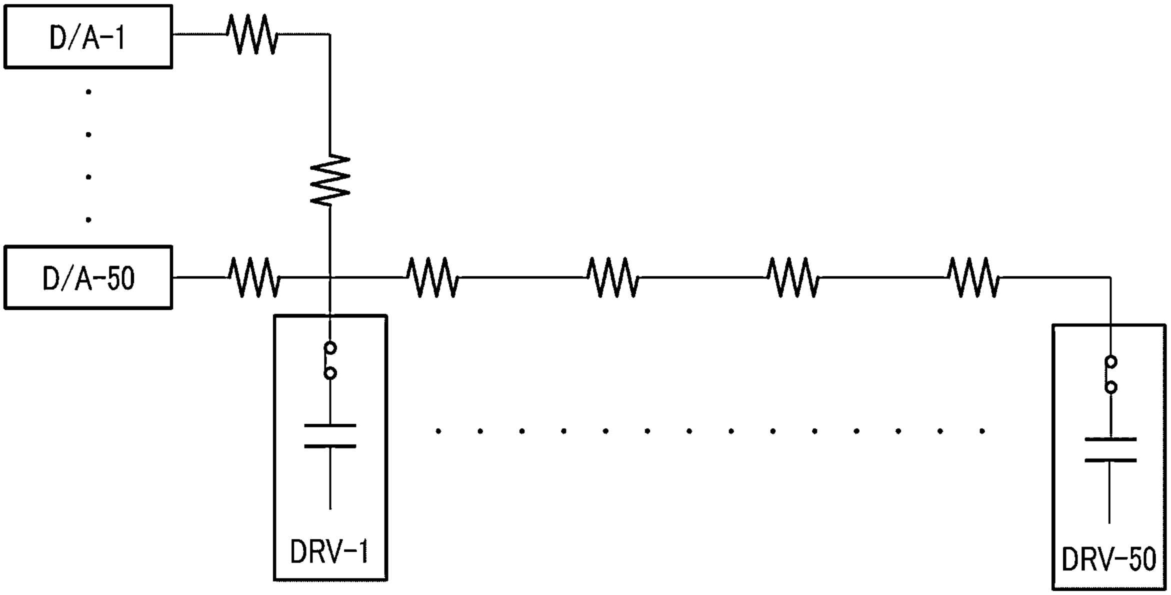
FIG. 14 schematically depicts another relationship between differences in wiring lengths and resistance components.

FIGS. 13 and 14 are diagrams schematically depicting the relationship between wiring length of the D/A signal wiring and the resistance component.

As shown in FIG. 13, the difference in the wiring length connecting the D/A conversion circuit and the DRV circuit causes a difference in the resistance component (R). The difference in the resistance component causes a difference in time constant (CR) when the D/A conversion circuit charges the capacitor (C) of the DRV circuit.

In FIG. 14, the wiring is changed to reduce the difference in the wiring length between the D/A conversion circuit and the DRV circuit. When the difference in the wiring length is reduced, the difference in the resistance component (R) is also reduced. When the difference in the resistance component is reduced, the difference in the time constant (CR) when the D/A conversion circuit charges the capacitor (C) of the DRV circuit is also reduced.

Figure 15:
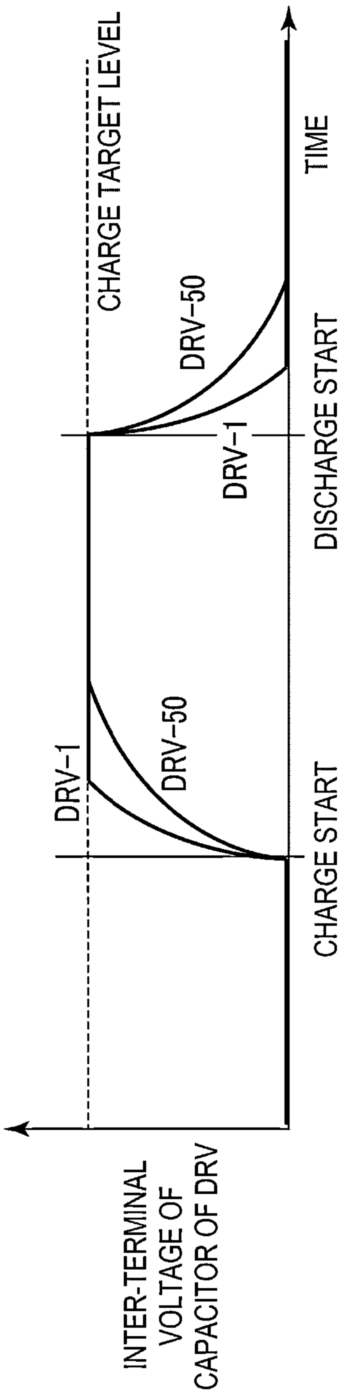
FIG. 15 shows an influence of the difference in wiring lengths.

FIG. 15 shows an influence of the differences in the wiring length of the D/A signal wiring.

When the D/A conversion circuit charges and discharges the capacitor of the DRV circuit and there is a difference in the time constant (CR) for the different DRV circuits, thus a difference occurs in time required for charging and discharging the respective capacitors of the different DRV circuits. For example, as shown in FIG. 15, the time required for charging and discharging the capacitor of the DRV-50 is longer than that of the DRV-1. When there is a difference in time required for charging and discharging the capacitor as described above, a difference may occur in the voltage held by the respective capacitors depending on the timing of the SH (sample and hold) signal.

Figure 16:
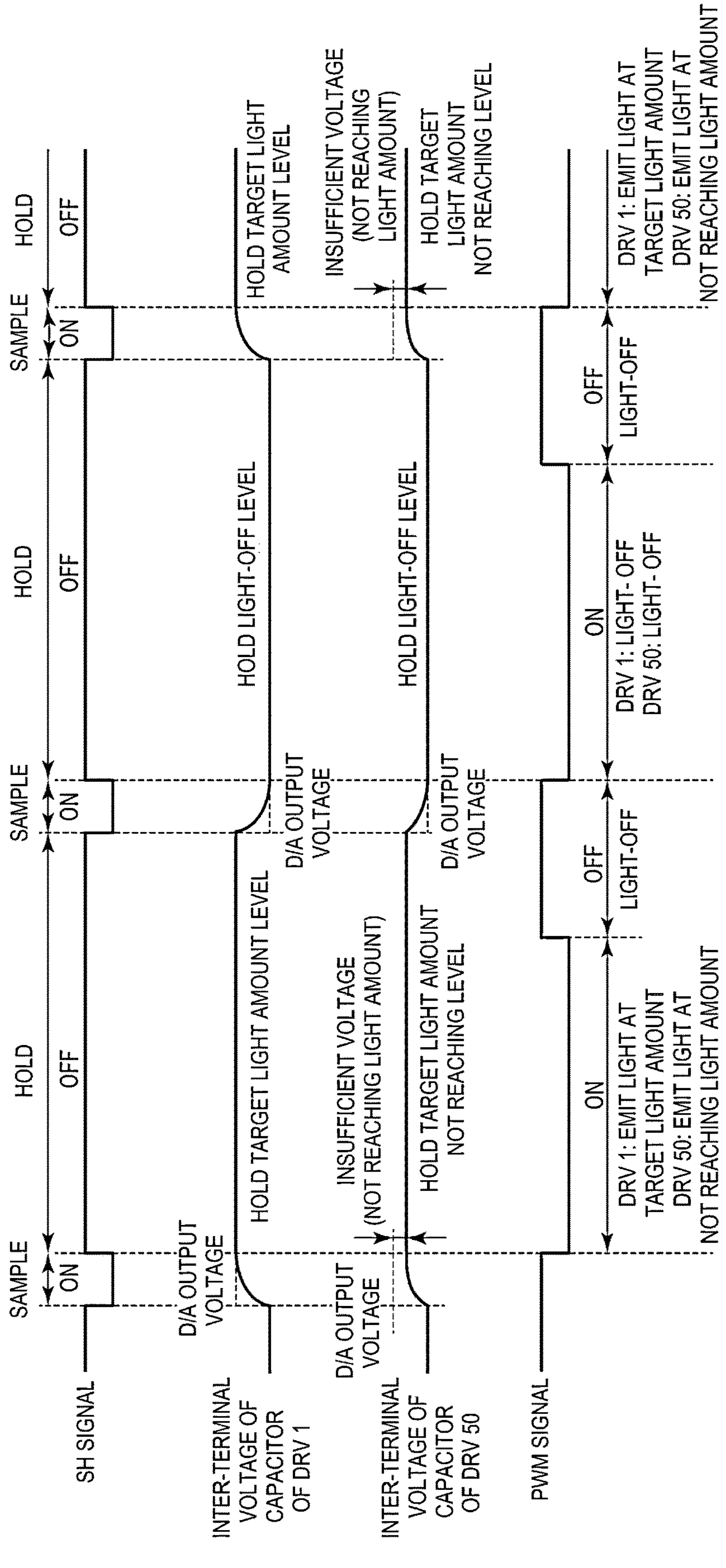
FIG. 16 is a timing chart related to the influence of the differences in wiring lengths.

FIG. 16 is a timing chart depicting the influence of the difference in the wiring length of the D/A signal wirings. FIG. 16 shows a transition example of the light emission, the light-off, and the light emission for the DRV 1 and the DRV 50. As shown in FIG. 16, the DRV 50 having a long wiring length is not fully charged in time before the change of the SH signal level, and thus the light emitting element 131 does not emit light at the target light intensity. In contrast, the DRV 1 having a short wiring length can be charged in time before the change in the SH signal level, and thus the light emitting element 131 emits light at the target light intensity.

The operation of a DRV 50 that does not cause light emission at the target light intensity will be described.

At the first sample time (SH signal=L), the D/A conversion circuit outputs the voltage for the target light emission level. Since the time constant of the DRV 50 is large and it takes a relatively long time to charge the DRV 50, the inter-terminal voltage of the capacitor does not reach the target level within the provided sample time. When the SH signal changes to the H level, the voltage of the capacitor of DRV has not reach the target level. While the PWM signal is at the L level, a current corresponding to the actual voltage held in the capacitor flows through the light emitting element 131. During this time, the light emitting element 131 emits light not reaching the target level. That is, there is a difference between output of the light emitting elements 131 for the DRV 1 having shorter wiring length and the output of the light emitting elements 131 of the DRV 1 having longer wiring length.

At the next sample time (SH signal=L), the D/A conversion circuit outputs the voltage of the light-off level. The inter-terminal voltage of the capacitor follows (samples) the light-off level voltage. When the SH signal is at the H level, a voltage corresponding to the light-off level is held between the terminals of the capacitor. While the PWM signal is L, a current corresponding to the voltage held in the capacitor flows through the light emitting element 131. Since the light emitting element 131 is at the light-off level, no current flows through the light emitting element 131 and the light emitting element 131 does not emit light.

Figure 17:
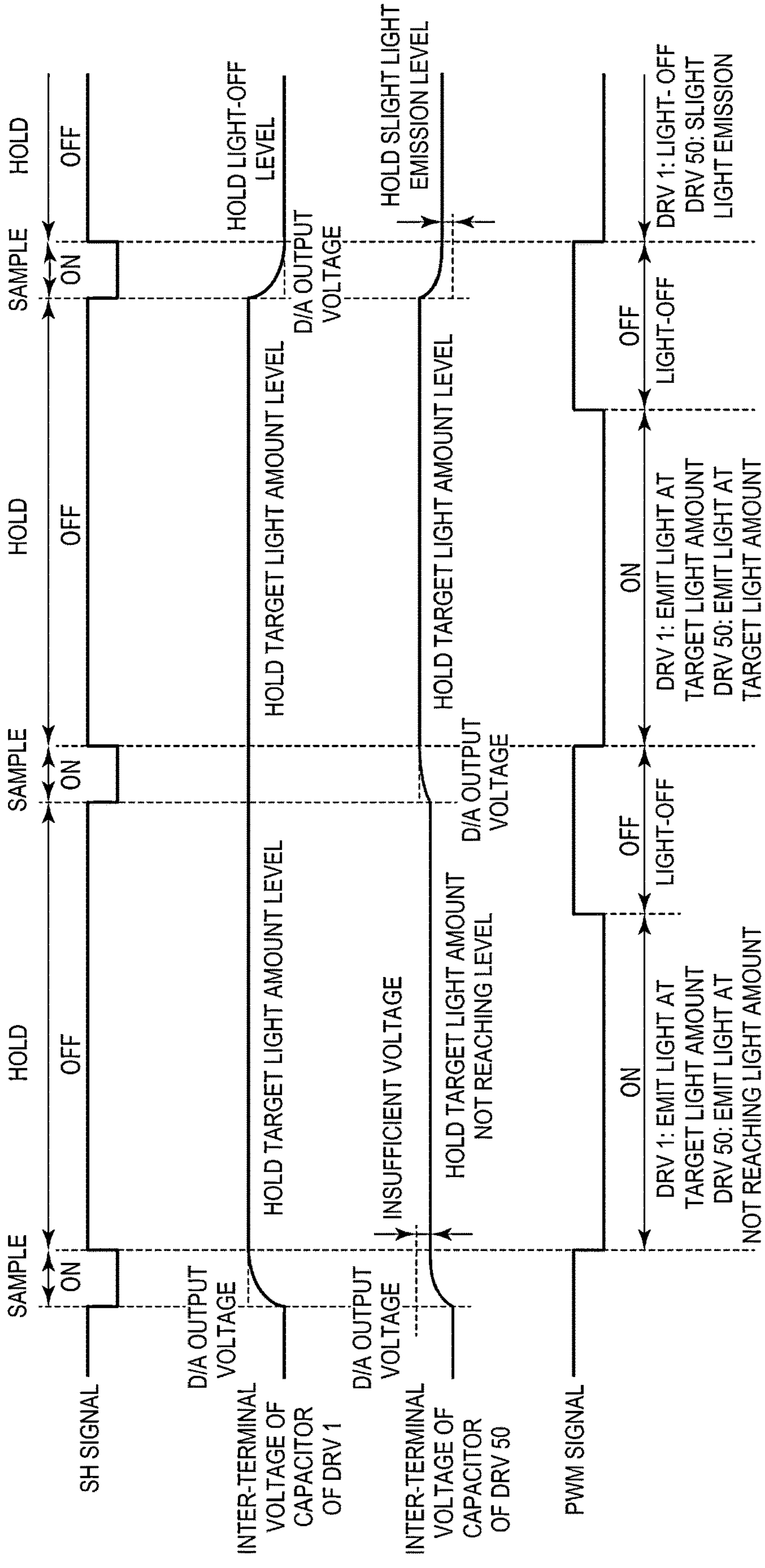
FIG. 17 is a timing chart of related to the influence of the differences in wiring lengths.

FIG. 17 is a timing chart of another influence of the difference in the wiring length of the D/A signal wiring. FIG. 17 shows a transition example of the light emission, the light emission, and the light-off for the DRV 1 and the DRV 50. As shown in FIG. 17, the DRV 50 having the long wiring length is not charged in time, and the light emitting element 131 does not emit light at the target light amount from the initial emission. However, for subsequent light emissions, the light emitting element 131 emits light at the target light level. Though when an attempt is then made to turn off the light emitting element 131 (stop light emission), the discharge does not catch up, and the light emitting element 131 might not be completely turned off. On the other hand, since the DRV 1 having the short wiring length is in time for both charging and discharging, the light emitting element always emits light at the target light amount at the time of the light emission, and is completely turned off at a time of light-off.

The operation of the DRV 50 that does not emit light at the target light amount will be described.

At the first sample time (SH signal=L), the D/A conversion circuit outputs the voltage of the target light emission (level. Since the time constant of the DRV 50 is large, it takes time to charge the DRV 50. Thus, the inter-terminal voltage of the capacitor does not reach the target level within the sample time. When the SH signal is H, a voltage not at the target level is held between the terminals of the capacitor. While the PWM signal is at the L level, a current corresponding to the actual voltage held in the capacitor flows through the light emitting element 131. During this time, the light emitting element 131 emits light but not at the target output level. That is, there is a difference between output of the light emitting element 131 of the DRV 1 (having the short wiring length) and the output of the light emitting element 131 of the DRV 1 (having the long wiring length).

At the next sample time (SH signal=L), the D/A conversion circuit outputs the voltage for the target light emission level again. The voltage held between the terminals of the capacitor reaches the target level this sample time since the starting point voltage was higher than the full discharge level. When the SH signal is at the H level again, the voltage of the target light emission (level is held between terminals of the capacitor. Then when the PWM signal is at the L level again, the current corresponding to the voltage held in the capacitor flows through the light emitting element 131. During this time, the light emitting element emits light at the target light amount level.

At the next sample time (SH signal=L), the D/A conversion circuit again outputs the voltage of the light-off level. The inter-terminal voltage of the capacitor follows the light-off level voltage again but does not reach the light-off level (thus, remains at a slight light emission level in this example). When the SH signal becomes H again, a voltage at the slight light emission level is held between the terminals of the capacitor. While the PWM signal is L, a current corresponding to the voltage held in the capacitor flows through the light emitting element 131. The light emitting element 131 thus emits thus light at the slight light emission level (partial on level).

Figure 18:
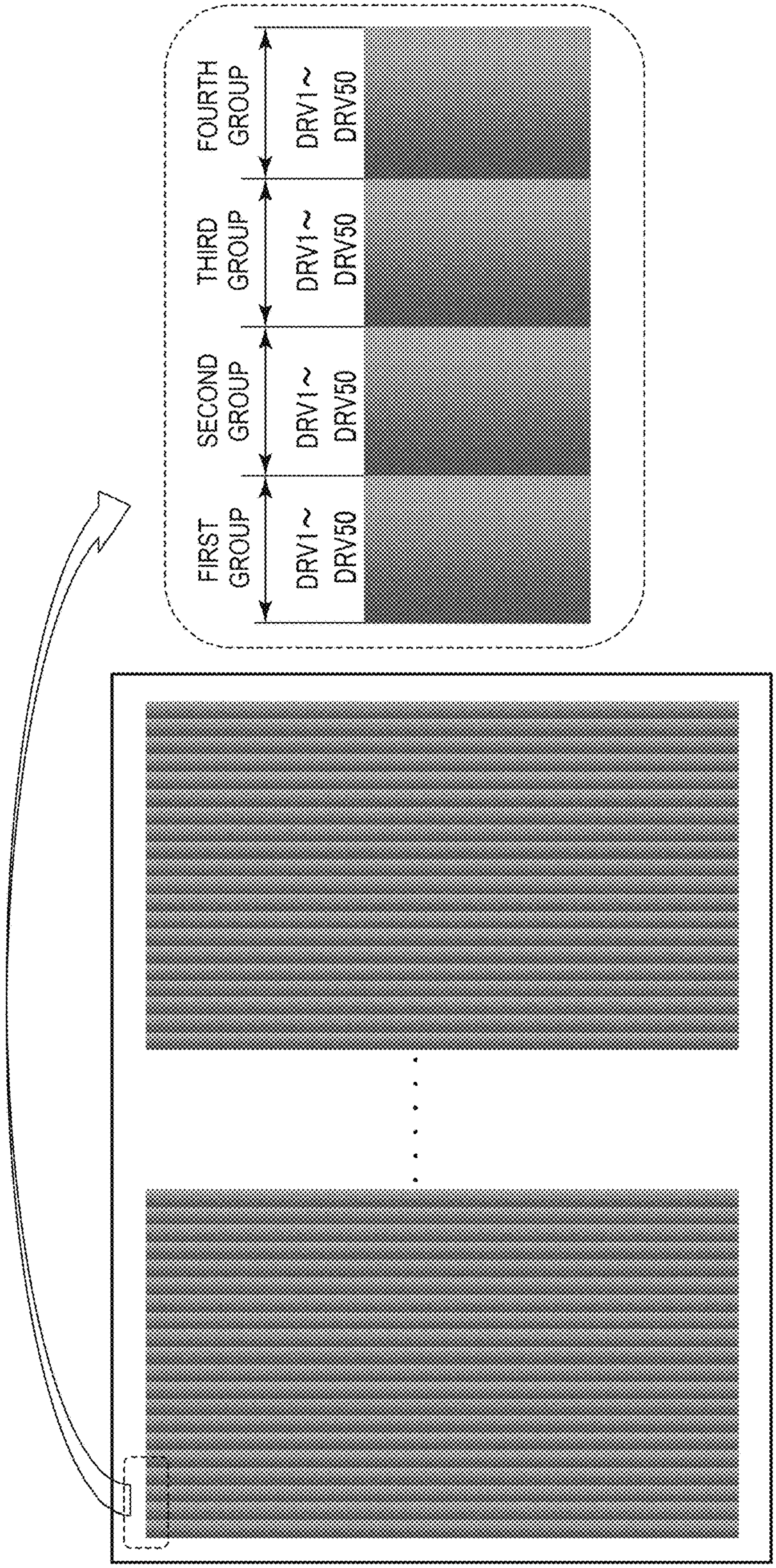
FIG. 18 shows an example of a defect in an image caused by the influence of differences in wiring lengths.

FIG. 18 shows an example of an influence of the difference in the wiring lengths of the D/A conversion circuit resulting in an image defect.

As shown in FIG. 12, when the difference in the wiring length of the D/A conversion circuits is large, the light amount continuously changes from DRV 1 to DRV 50 within each light emitting element group. The change in the light amount occurs on a group cycle basis (here, a cycle of 50 dots). When a halftone image is being formed, as shown in FIG. 18, unevenness may occur with a cycle of 50 dots.

In contrast, a print head of the present embodiment has the first wiring pattern shown in FIG. 6 or the second wiring pattern shown in FIG. 7 to reduce and/or eliminate the defects caused by such wiring length differences, so that the light amount of the light emitting elements 131 can be more uniform. Accordingly, the image quality can be improved.

While embodiments are described, these embodiments are presented by way of example only, and are not intended to limit the scope of the disclosure. Indeed, the novel embodiments described herein may be embodied in a variety of other forms, and various omissions, substitutions and changes may be made without departing from the spirit of the disclosure. The embodiments and modifications are included in the scope and the gist of the disclosure, and are included in the scope of the inventions described in the claims and equivalents thereof.

What is claimed is:

1. A print head, comprising:

a first light emitting element on a substrate;

a first drive circuit connected to the first light emitting element and including a first capacitor, the first drive circuit being configured to control a light emission level of the first light emitting element by charging the first capacitor to a target level;

a second light emitting element on the substrate and separated from the first light emitting element by an element arrangement pitch value along a main scanning direction parallel to the substrate;

a second drive circuit connected to the second light emitting element and including a second capacitor, the second drive circuit being configured to control a light emission level of the second light emitting element by charging the second capacitor to a target level; and a control circuit on the substrate and connected to the first drive circuit by a first wiring and the second drive circuit by a second wiring, the control circuit being configured to individually control voltages across the first and second capacitors at a predetermined timing, wherein a difference between a length of the first wiring and a length of the second wiring is less than the element arrangement pitch value, the first wiring includes a first main wiring portion that is connected to the control circuit and extends in the main scanning direction and a first branch wiring portion that branches from the first main wiring portion at a first branch position, the first branch wiring portion being connected to the first drive circuit and extending in a sub-scanning direction that is parallel to the substrate, but intersecting the main-scanning direction, and the second wiring includes a second main wiring portion that is connected to the control circuit and extends in the main scanning direction and a second branch wiring portion that branches from the second main wiring at a second branch point, the second branch wiring portion being connected to the second drive circuit and extending in the sub-scanning direction.

2. The print head according to claim 1, wherein the control circuit is configured to control light emission by groups of light emitting elements of two or more arranged along the main scanning direction, light emitting elements in the same group being arranged along the main scanning direction at the element arrangement pitch value, the first and second light emitting elements are in the same group, and the difference in the length of wirings of light emitting elements in the same group located at opposite ends of the group in the main scanning direction is the maximum difference in the lengths of wirings for any two light emitting elements in the same group, and less than (M−1) multiplied by the element arrangement pitch value, where M is equal to the number of light emitting elements in the same group.

3. The print head according to claim 1, wherein the control circuit is configured to output a light emission level signal via the first and second wirings, the light emission level signal being based on image data, and the control circuit is connected to the first drive circuit and the second drive circuit by a third wiring, and the control circuit outputs a sample hold signal via the third wiring.

4. The print head according to claim 1, wherein the first wiring includes a first extension wiring portion between the control circuit and the first main wiring portion and extending in the sub-scanning direction, the second wiring includes a second extension wiring portion between the control circuit and the second main wiring portion and extending in the sub-scanning direction, and the difference between the length of the first wiring and the length of the second wiring is substantially zero.

5. The print head according to claim 4, wherein the first main wiring portion and the second main wiring portion are spaced from each other in the sub-scanning direction by a multiple of a wiring pitch, the wiring pitch being less than the element arrangement pitch value.

6. The print head according to claim 1, wherein the first main wiring portion and the second main wiring portion are spaced from each other in the sub-scanning direction by a wiring pitch, the wiring pitch being less than the element arrangement pitch value.

7. The print head according to claim 1, wherein the length of the first wiring is equal to the length of the second wiring.

8. A print head, comprising:

a plurality of light emitting elements spaced along a main scanning direction at an element arrangement pitch;

a plurality of drive circuits spaced along the main scanning direction at the element arrangement pitch, each light emitting element being connected to a respective one of the drive circuits, each driving circuit including a capacitor configured to control a light emission level of the light emitting element according to a charge level of the capacitor;

a control circuit connected to the plurality of drive circuits and configured to control emission of light from the plurality of light emitting elements by supply of electrical signals to the plurality of drive circuits in groups, each group of drive circuits being drive circuits adjacent to one another in the main scanning direction;

a plurality of first group wirings connecting the control circuit to one of the groups of drive circuits, wherein a difference in length between any first group wiring in the plurality of first group wirings and every other first group wiring in the plurality of first group wirings is less than the element arrangement pitch, and each first group wiring includes a first main wiring portion that is connected to the control circuit and extends in the main scanning direction and a first branch wiring portion that branches from the first main wiring portion at a first branch position, the first branch wiring portion being connected to the respective drive circuit and extending in a sub-scanning direction intersecting the main-scanning direction.

9. The print head according to claim 8, wherein the control circuit includes a light amount control circuit configured to simultaneously control each drive circuit within a group of drive circuits to charge or discharge the respective capacitors.

10. The print head according to claim 8, wherein each first group wiring has an equal length from the control circuit to the respective drive circuit of the one of the groups of drive circuits.

11. The print head according to claim 8, wherein the first main wiring portions are spaced from each other in the sub-scanning direction by less than the element arrangement pitch.

12. The print head according to claim 8, wherein each first group wiring further includes a first extension wiring portion between the control circuit and the first main wiring portion extending in the sub-scanning direction, and each first wiring extension portion is a different length.

13. The print head according to claim 8, wherein portions of each first group wiring are shared by every other group of drive circuits in the plurality of drive circuits, and each group of drive circuits is individually connected to the control circuit by a different signal wire connected in common to every drive circuit in the respective group.

14. An image forming device, comprising:

a print head configured to selectively emit light according to image data to be printed, the print head including:

a first light emitting element on a substrate;

a first drive circuit connected to the first light emitting element and including a first capacitor, the first drive circuit being configured to control a light emission level of the first light emitting element by charging the first capacitor to a target level;

a second light emitting element on the substrate and separated from the first light emitting element by an element arrangement pitch value along a main scanning direction parallel to the substrate;

a second drive circuit connected to the second light emitting element and including a second capacitor, the second drive circuit being configured to control a light emission level of the second light emitting element by charging the second capacitor to a target level; and a control circuit on the substrate and connected to the first drive circuit by a first wiring and the second drive circuit by a second wiring, the control circuit being configured to individually control voltages across the first and second capacitors at a predetermined timing, wherein a difference between a length of the first wiring and a length of the second wiring is less than the element arrangement pitch value, the first wiring includes a first main wiring portion that is connected to the control circuit and extends in the main scanning direction and a first branch wiring portion that branches from the first main wiring portion at a first branch position, the first branch wiring portion being connected to the first drive circuit and extending in a sub-scanning direction that is parallel to the substrate, but intersecting the main-scanning direction, and the second wiring includes a second main wiring portion that is connected to the control circuit and extends in the main scanning direction and a second branch wiring portion that branches from the second main wiring at a second branch point, the second branch wiring portion being connected to the second drive circuit and extending in the sub-scanning direction.

15. The image forming device according to claim 14, wherein the control circuit is configured to control light emission by groups of light emitting elements of two or more arranged along the main scanning direction, light emitting elements in the same group being arranged along the main scanning direction at the element arrangement pitch value, the first and second light emitting elements are in the same group, and the difference in the length of wirings of light emitting elements in the same group located at opposite ends of the group in the main scanning direction is the maximum difference in the lengths of wirings of any two light emitting elements in the same group, and less than (M−1) multiplied by the element arrangement pitch value, where M is equal to the number of light emitting elements in the same group.

16. The image forming device according to claim 14, wherein the control circuit is configured to output a light emission level signal via the first and second wirings, the light emission level signal being based on the image data, and the control circuit is connected to the first drive circuit and the second drive circuit by a third wiring, and the control circuit outputs a sample hold signal via the third wiring.

17. The image forming device according to claim 14, wherein the length of the first wiring is equal to the length of the second wiring.

18. The image forming device according to claim 14, wherein the first wiring further includes a first extension wiring portion between the control circuit and the first main wiring portion and extending in the sub-scanning direction, the second wiring further includes a second wiring extension portion between the control circuit and the second main wiring portion and extending in the sub-scanning direction, and the first and second wiring extension portions are a different length.

19. The image forming device according to claim 18, wherein the difference between the length of the first wiring and the length of the second wiring is substantially zero.

20. The image forming device according to claim 14, wherein the first main wiring portion and the second main wiring portion are spaced from each other in the sub-scanning direction by a multiple of a wiring pitch, the wiring pitch being less than the element arrangement pitch value.

* * * * *